(12) United States Patent
Melnick et al.

(10) Patent No.: US 10,957,158 B2
(45) Date of Patent: *Mar. 23, 2021

(54) SMART PROGRESSIVE GAMING SYSTEM

(71) Applicant: AGS LLC, Las Vegas, NV (US)

(72) Inventors: Scott Andrew Melnick, Atlanta, GA (US); Andrew James Burke, Henderson, NV (US); Anil Kumar Narra, Alpharetta, GA (US); Bradley Donald Schultz, Brookhaven, GA (US); Leah Anne Pinnow, John's Creek, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,683

(22) Filed: Jul. 31, 2019

(65) Prior Publication Data

US 2019/0355215 A1    Nov. 21, 2019

Related U.S. Application Data

(63) Continuation of application No. 15/958,657, filed on Apr. 20, 2018, now Pat. No. 10,445,983.

(51) Int. Cl.
*A63F 9/24* (2006.01)
*A63F 11/00* (2006.01)
(Continued)

(52) U.S. Cl.
CPC .......... *G07F 17/3258* (2013.01); *G06F 21/81* (2013.01); *G06N 5/003* (2013.01); *G06N 20/00* (2019.01); *G07F 17/3223* (2013.01)

(58) Field of Classification Search
USPC .............................. 463/1, 20, 22, 25, 30, 39
See application file for complete search history.

(56) References Cited

U.S. PATENT DOCUMENTS

| 4,795,155 A | 1/1989 | Grande |
|---|---|---|
| 5,042,810 A | 8/1991 | Williams |

(Continued)

FOREIGN PATENT DOCUMENTS

| AU | 589158 | 8/1986 |
|---|---|---|
| AU | 655801 | 9/1992 |

OTHER PUBLICATIONS

Notice of Allowance and Fee(s) Due dated Jun. 12, 2019 in U.S. Appl. No. 15/958,657.

(Continued)

*Primary Examiner* — Adetokunbo O Torimiro
(74) *Attorney, Agent, or Firm* — Vierra Magen Marcus LLP

(57) ABSTRACT

An artificial intelligence (AI) learning machine is integrated into a gaming system to adaptively learn to predict when and where excessive chronological clustering of winning hits is likely to occur for a progressive jackpot (e.g., a high frequency one) within the gaming system, to preemptively prepare for such occurrences by prefunding one or more smart-awards funds to cope with such excessive chronological clusterings of hits and to use the one or more smart-awards funds to pay off not-first-in-time winners with a same jackpot award amount as is paid to the true first-in-time winner of the jackpot if such runner up winners hit their respective win conditions within a predetermined smart-awards time span after the first-in-time winner hits. This can avoid or reduce feelings of unfairness by the not-first-in-time winners especially when the latter hit just a split second after the true first-in-time winner hits the jackpot.

24 Claims, 12 Drawing Sheets

(51) Int. Cl.
*G06F 13/00* (2006.01)
*G06F 17/00* (2019.01)
*G07F 17/32* (2006.01)
*G06N 20/00* (2019.01)
*G06F 21/81* (2013.01)
*G06N 5/00* (2006.01)

(56) References Cited

U.S. PATENT DOCUMENTS

| | | |
|---|---|---|
| 5,116,055 A | 5/1992 | Tracy |
| 5,280,909 A | 1/1994 | Tracy |
| 5,344,144 A | 9/1994 | Canon |
| 5,655,961 A | 8/1997 | Acres et al. |
| 5,851,149 A | 12/1998 | Xidos et al. |
| 5,876,284 A | 3/1999 | Acres et al. |
| 6,110,043 A | 8/2000 | Olsen |
| 6,146,273 A | 11/2000 | Olsen |
| 6,210,275 B1 | 4/2001 | Olsen |
| 6,217,448 B1 | 4/2001 | Olsen |
| 6,231,445 B1 | 5/2001 | Acres |
| 6,241,608 B1 | 6/2001 | Torango |
| 8,740,692 B2 | 6/2014 | Yoseloff et al. |
| 9,342,956 B2 | 5/2016 | Hughes |
| 2002/0032051 A1 | 3/2002 | Stockdale |

OTHER PUBLICATIONS

International Search Report and Written Opinion dated Jul. 23, 2019 in International Patent Application No. PCT/US2019/027818.

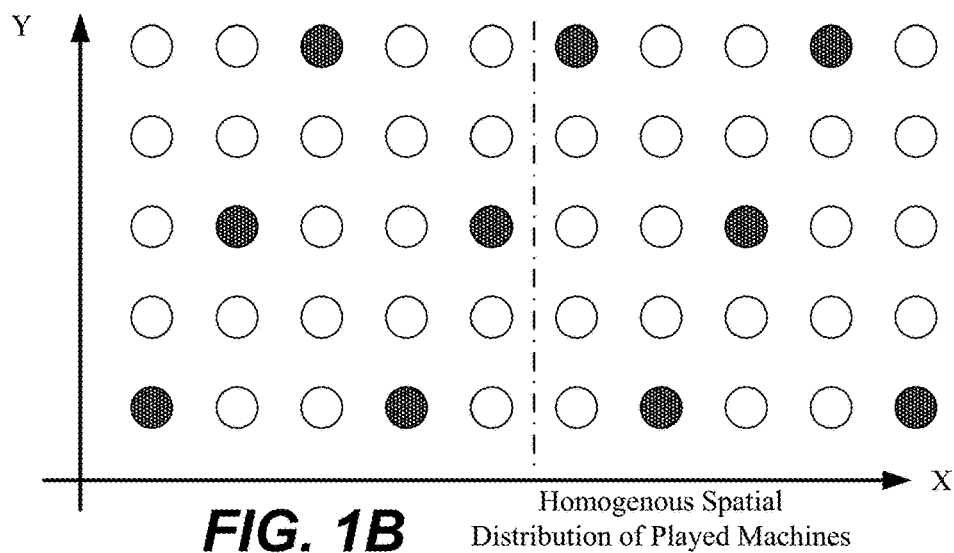
FIG. 1B Homogenous Spatial Distribution of Played Machines
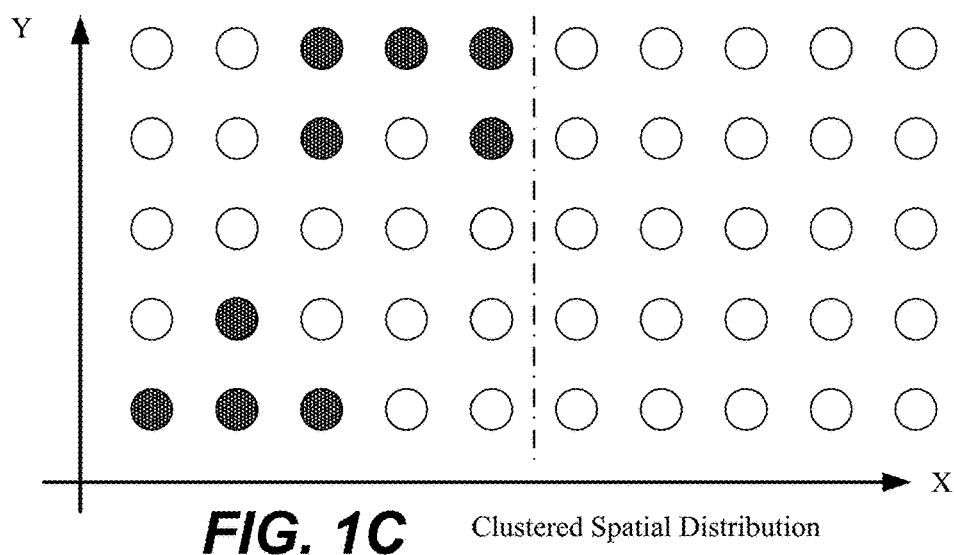
FIG. 1C Clustered Spatial Distribution
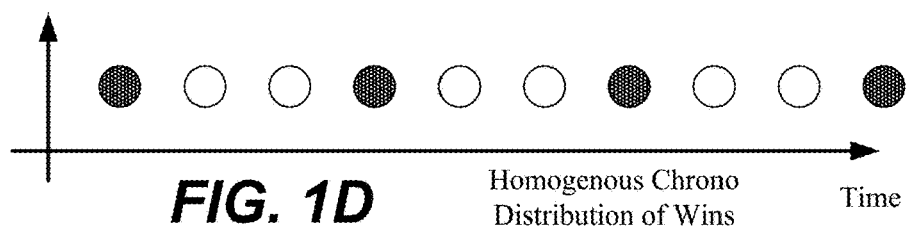
FIG. 1D Homogenous Chrono Distribution of Wins
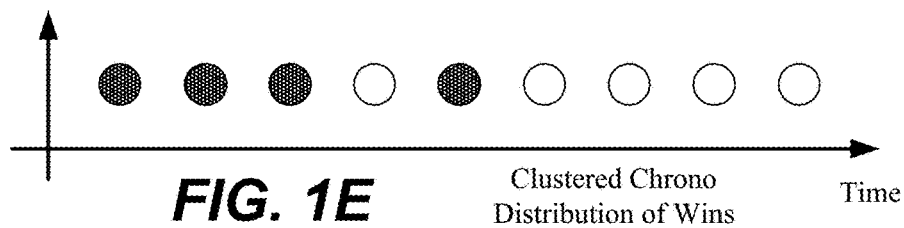
FIG. 1E Clustered Chrono Distribution of Wins

SMART PROGRESSIVE GAMING SYSTEM

This application is a continuation of and claims benefit of U.S. patent application Ser. No. 15/958,657, filed Apr. 20, 2018, now issued as U.S. Pat. No. 10,445,983 and originally entitled "SMART PROGRESSIVE GAMING SYSTEM" where the disclosure of said application is incorporated herein by reference in its entirety.

TECHNICAL FIELD

The present disclosure of invention relates to operations of gaming machines within a gaming environment.

BACKGROUND

Slot-type electronic and/or mechanical gaming machines, often also referred as slot machines, are popular fixtures in casino or other gaming environments. Such slot machines are generally controlled by installed software programs that enable rapid gaming action. Aside from slot machines, various other kinds of gaming devices, including electronically-assisted gaming tables are also generally controlled by installed software programs that enable rapid gaming action, not only for the particular gaming device, but also across large communities of similar gaming devices. More specifically, interest in gaming action can be enhanced by providing for community-based chances at winning growing jackpot pools, often referred to as progressives. Sometimes, the rapid gaming action moves faster than signage update or apparent signage update action (as apparent to players). This can lead to problems including some elucidated below.

Participants in gaming environments may include one or more primary players who are directly using the slot or other software driven gaming apparatuses, one or more locally adjacent players who are directly using locally adjacent slot or other software driven gaming apparatuses (e.g., as in the case of a "bank" of slot machines all participating in a bank-wide progressive pool). Participants in gaming environments may include in-casino further players who are participating in one or more in-casino progressive jackpot pools and wide area players who are participating in a jurisdictionally sanctioned wide area progressive jackpot pools that extend over a plurality of casinos or other such distinct localities. Participants typically also include adjacent bystanders (e.g., players' friends) who are standing nearby the primary players and include nearby passers by who happen to be passing by in an area where they can view part of the gaming action(s) of one or more of the slot or other software driven gaming apparatuses including displays (e.g., video monitors presenting signage updates) of the progressively growing local or other larger area jackpot pools and the occasional (rare or more frequent) awarding of such jackpots.

As a general but not absolute rule, it has been observed that when the available number of slot machines that can participate in a given progressive pool increases and/or when the number of players playing those machines and thus participating in the given progressive pool increases, then the accumulating jackpot prize amount—call it P(J,t) where P is the current Prize amount at time point t and J is the identity of the specific progressive jackpot pool—for that given progressive pool J tends to grow faster (has a faster climb rate, $\Delta P/\Delta t$) while at the same time the average delay between hits $\text{Avg}(t_{h2}-t_{h1})$—where h2 is hit number 2 and h1 is immediately preceding hit one—which hits entitle the respective hitting player to win the then present prize amount ($P(J,t_{h2})$, $P(J,t_{h1})$) tends to shrink. As a result, player/bystander excitement with respect to that given progressive pool J tends to increase, and then more players tend to join in and the jackpot climb rate $\Delta P/\Delta t$ increases even faster while average delay between jackpot hits $\text{Avg}(t_{h(i+1)}-t_{hi})$—where i is an incrementing integer—tends to shrink even more. For certain types of progressives there can come a period in time when due to random chance, the instantaneous delays between two or more hits, $t_{h(i+1)}-t_{hi}$ approaches zero or another small value that appears to the human players as if it is essentially zero.

Larger ones of progressive jackpots (e.g., mega-jackpots for example in the range of $10,000 or more) tend to be hit and awarded on a highly infrequent basis (e.g., less than one per day on average). Players know this and thus tend to shy away from using machines that offer no chances other than the very infrequently awarded mega-jackpot. To make the games more interesting and enticing, casinos typically allow smaller groups (e.g., banks totaling say 10 or 20) of their machines to participate in smaller progressive jackpots that pay off more often. The smaller or mini jackpots (e.g., awards of in the range of about $1,000 or less, more typically $100 or less) tend to be hit and awarded much more frequently than the mega-jackpot (e.g., at least a handful of times per day on average if not even more often). Players see these more frequently paying-off machine as being apparently more "lucky" and thus tend to flock to machines or machine banks that appear to be hitting their mini jackpots more often. To these players the specific machines at their specific locations appear to be more lucky at the moment. As more players flock to the mini jackpot machines in the specific, appearing to be "lucky" location, the local jackpot climb rate ($\Delta P/\Delta t$) for the respective mini jackpot $J_{mini}$ grows and average delay between hits ($\text{Avg}(t_{h(i+1)}-t_{hi})$) tends to shrink. That can entice even more players to flock to those specific machines. As frequency of payoffs for the smaller progressive jackpots increases (and average delay between hits shrinks), problems can emerge. Some of these problems are the result of the high speed at which the electronic gaming devices determine gaming action outcome versus the comparatively slower speed at which electronic or other signage devices (e.g., video monitors) get updated and/or versus the comparatively slower response time of human players.

More specifically, in the case of the smaller and more frequently hit progressive jackpot pools, two players can be sitting side-by-side at essentially identical slot machines in a crowded casino where both players hit a win for the same mini jackpot fund $J_{mini}$ within a few seconds or less of one another. In other words, $t_{h(i+1)}-t_{hi}<S$ seconds (where S for example can be 10 or less). Yet more specifically and merely as an example, the hit and win procedure of the given progressive jackpot pool $J_{mini}$ may entail each player having a go at a lottery-scratch-to-win type of prize determination mechanism. Both players will be focusing on scratching off a pattern on their virtual scratch-to-win tickets. Because of the rapid speed at which the electronic slot (or other) gaming devices work internally, one of the players will be conventionally awarded the currently and publicly displayed mini-jackpot amount (of say $P(J,t_{h1})=\$100$) but the adjacent player is awarded a de-minimis and temporarily hidden replenishment amount (say $P(J,t_{h2})=\$5$, where $t_{h2}$ comes a split second after LIU. Seeing that her neighbor got $100 and she only $5, the second player feels cheated. She may hit the operator assistance button. When a casino agent comes to the gaming machine requesting operator assistance (e.g., with a flashing orange light), the second player lodges her complaint or "dispute" not only directly to the casino agent but often also in front of nearby others. She may say something like, "My machine is broken and not fair. I got exactly the same spin and scratch results as on hers. She won $100 and I got a measly $5! How can that be?" (One reason why the second-in-time player typically gets $5 and not $0 is because of an automatic replenishment mechanism disclosed for example in U.S. Pat. No. 5,042,810 to Williams and briefly described later below. A method for keeping track of multiple jackpots is disclosed in U.S. Pat. No. 5,344,144 to Canon and includes use of date stamped history records.)

Casinos do not like to be caught in such binds where, although the gaming machines operate as advertised, customers feel cheated, dissatisfied, may lodge complaints either then or later to friends and then the reputation of the casino for fairness may degrade. A solution to this bind is desired.

It is to be understood that some concepts, ideas and problem recognitions provided in this description of the Background may be novel rather than part of the prior art.

SUMMARY

Various embodiments in accordance with the present disclosure of invention generally relate to improved operating of gaming machines that participate in progressive jackpot pools. In accordance with one aspect of the present disclosure, a "smart-awards" or appearance-of-fairness-creating reserve fund (also alternatively referred to herein as a good customer relations maintaining fund) is progressively built up to a machine-determined positive balance level. When two or more players hit respective wins for a high frequency progressive jackpot (as opposed to a larger progressive jackpot with substantially lower odds of winning it) within a predetermined "smart-awards" time span (e.g., a machine-determined span, for example consecutive hits within about 10 seconds or less of the first-in-time winner), the first-in-time winner is awarded the jackpot prize amount $P(J,t_{h1})$ out of the normal jackpot accumulating fund present at corresponding hit time $t_{h1}$. Rather than awarding zero, or a de minimis default or replenishment amount $P(J,t_{h2})$ to the next runner up winner in accordance with strict adherence to the rules of the game (and then zero or slightly above to further runner up winners within the smart-awards time span), the machine system plays the situation more "smartly" (less strictly) for the sake of maintaining good customer-relations and awards a matching, smart-awards amount $S(J)=P(J,t_{h1})$ drawn out of a smart-awards reserve fund for each runner up winner who was not first-in-time but nonetheless got a winning outcome within the predetermined smart-awards time span (e.g., within about 10 seconds or less after the first-in-time winner hit his/her jackpot winning outcome). In one embodiment, this is done for every runner up within the smart-awards time span even if the smart-awards reserve fund goes negative. Then after the smart-awards reserve fund is drawn from (even if into negative territory), a contribution rate for replenishing the smart-awards reserve fund is automatically determined by a machine-implemented process (e.g., an automated learning machine) for returning the smart-awards reserve fund back to a predetermined and currently maximum positive balance level. In one embodiment, the amount of the current maximum positive balance level amount is also determined and over time adjusted by the automated learning machine based on context. The contributions for building and re-building the smart-awards reserve fund are taken out as a fraction out of total contributions for the corresponding progressive pool $P(J,t)$ where the total progressives contributions are taken out as a fraction from wagers placed by players participating in the corresponding progressive to build up at least the displayed jackpot amount for the progressive (e.g., for the mini-jackpot) and optionally to build up hidden replenishment funds that replenish the displayed jackpot amount to a predetermined default or de minimis amount immediately after the jackpot is depleted by a first-in-time winner hitting that jackpot and in the case of the present disclosure of invention, to also replenish the smart-awards reserve fund.

In accordance with one aspect of the present disclosure, a machine-implemented automated method is provided for reducing or eliminating feelings of lack of fairness by not-first-in-time players participating via respective one or more gaming machines in a high frequency jackpot pool (as opposed to a larger progressive jackpot pool with substantially lower odds of winning the latter) when the not-first-in-time players respectively hit the jackpot pool after an apparently short time of when a first-in-time other player also participating via respective one or more gaming machines hits a win for the jackpot pool and is thereby entitled to a reward amount that depletes the jackpot pool, the high frequency jackpot pool being configured to routinely allow consecutive hits of the jackpot within minutes or less of one another. In one embodiment, the method comprises: (a) automatically funding over time a hidden and accumulating smart-awards fund by taking contributions for the smart-awards reserve fund from wagers placed by the players participating in the high frequency jackpot pool; (b) automatically detecting whether one or more of the respective gaming machines of the not-first-in-time players respectively hit the jackpot pool within a predetermined "smart-awards" time window following when one of the respective gaming machines of the first-in-time other player hits the first-in-time win for the jackpot pool; and (c) responsive to determining that one or more of the respective gaming machines of the not-first-in-time players respectively hit the jackpot pool within the predetermined smart-awards time window, automatically drawing from the smart-awards reserve fund (even if it goes negative) and awarding to each of the not-first-in-time players whose respective gaming machine hits are within the predetermined smart-awards time window, an amount equal to the reward amount that the first-in-time other player is entitled to, wherein said automatic drawing from the smart-awards reserve fund is configured such that it can drive the balance of the smart-awards reserve fund negative (The copied awards are for a high frequency jackpot of relatively small amount which if it does, will generally only temporarily drive the smart-awards reserve fund to negative. If too many or too deep of negatives occur for certain contexts, the system will adjust the contribution rate or cap of the smart-wards reserve fund to try to avoid so driving the fund deep into the negative in future play under those contexts).

In one embodiment, the automatic detecting of whether one or more of the respective gaming machines of the not-first-in-time players respectively hit the jackpot pool within the predetermined smart-awards time window is based on time stamped meter records.

In one embodiment, the time stamped meter records have a resolution of $\frac{1}{100}$ of a second or less such that split second determinations can be made as to which gaming machine hit the jackpot first and which one or more others afterwards and also within the predetermined smart-awards time window.

In one embodiment, the automatic funding of the smart-awards reserve fund is controlled by heuristics developed by an automated learning machine.

Further aspects of the present disclosure of invention may be found in the following detailed descriptions.

BRIEF DESCRIPTION OF DRAWINGS

The present disclosure may be better understood by reference to the following detailed description taken in conjunction with the accompanying drawings, which illustrate particular embodiments in accordance with the present disclosure of invention.

FIG. 1B schematically illustrates one possible spatial distribution of players among a plurality of spatially adjacent gaming machines (e.g., slots) where the gaming machines may not all participate in a same progressive jackpot pool.

FIG. 1C schematically illustrates another possible spatial distribution (e.g., clustering) of players among a plurality of spatially adjacent gaming machines.

FIG. 1D schematically illustrates one possible chronological distribution of jackpot hits and wins by players using gaming machines (e.g., slots) participating in a same progressive jackpot pool.

FIG. 1E schematically illustrates another possible chronological distribution (e.g., clustering) of jackpot hits and wins by players using gaming machines (e.g., slots) participating in a same progressive jackpot pool.

DETAILED DESCRIPTION

Figure 1A:
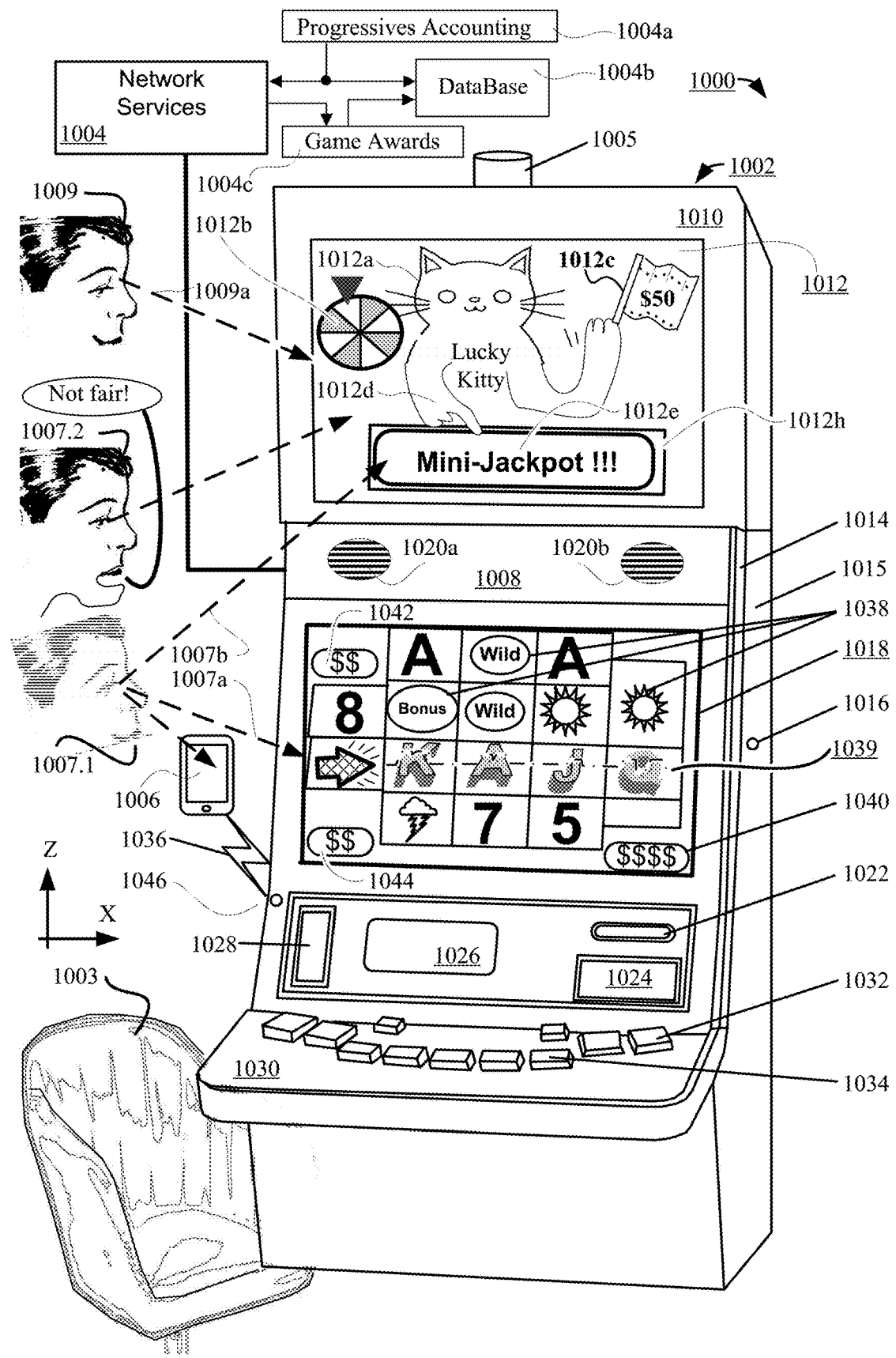
FIG. 1A illustrates a gaming system and environment including a wager-based gaming machine in accordance with the present disclosure.

Reference will now be made in detail to some specific embodiments in accordance with the present disclosure of invention. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure of invention. Although not explicitly shown in many of the diagrams, it is to be understood that the various automated mechanisms discussed herein typically include at least one data processing unit such as a central processing unit (CPU) where multicore and other parallel processing architectures may additionally or alternatively be used. It is to be further understood that the various automated mechanisms typically include or are operatively coupled to different kinds of non-transient storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices and so on. The various data processing mechanisms and data storage mechanisms may be operatively intercoupled by way of local buses and/or other communication fabrics where the latter may include wireless as well as wired communication fabrics.

In general, gaming systems which provide wager-based games are described. In particular, with respect to FIGS. 1A and 2, a gaming machine system including a plurality of automated wager-based gaming machines in communication with network devices is described. The gaming machine system can support wager-based games where one or more progressively growing prizes or awards (e.g., mega-jackpot, medium-jackpot, mini-jackpot) are made possible and/or where the unleashing of a whole series of bonuses (e.g., free spins) or other awards is made possible.

While slot machines and/or other gaming devices may use mechanical reels or wheels and/or video reels or wheels to present to the respective players both of action occurring during development of a game outcome and a finalized outcome of a gaming action, typically the actual gaming action takes place rapidly and invisibly in a secured electronic part of the system, the outcome is determined there (based on use of a truly random and/or pseudo-random outcome determining mechanism) and then later the development of the outcome and the final outcome are revealed to a corresponding one or more players by updating of various display and signage means such as video screens. The video screens (and/or other signage means) may also display pending award amounts, including those of the growing mega-jackpot amounts, of the medium-sized jackpot amounts and of the mini-jackpot amounts. Typically, before each gaming action by the machine system (e.g., including display of spinning of the reels or wheels), the player is required to ante up by placing at least one wager on the outcome of the gaming action. In some games, a player can elect to have at least part of one or more of his/her wagers (e.g., side wagers) correspondingly contributed to one or more progressive jackpot pools.

As a general but not absolute rule, participation in the mega-sized jackpots is spread over relatively large populations and areas; for example across all casinos of a given jurisdiction (e.g., state wide, county wide, city wide, reservation wide or similar). Participation in the medium-sized jackpots is spread over comparatively smaller populations and areas; for example across a group of casinos located within a subsection of a city (e.g., along the Las Vegas, Nev. casino strip). Moreover, participation in the mini-sized jackpots is spread over comparatively yet smaller populations and areas; for example across a bank of similar slot and/or other gaming devices within one casino (e.g., a bank of about 20 or fewer slot machines located in a same sector of the casino floor and all featuring as an example, the Lucky Kitty slot game—a fictitious game name used here in conjunction with FIG. 1A).

Excitement increases as the respective pending and displayed award amounts of the mega-sized, medium-sized and medium-sized progressive jackpot pools grow and reach relatively large values for their respective pool communities. But then someone hits the jackpot and the corresponding machine-internal meter amount drops dramatically, possibly down to zero or close to zero. The publicly displayed pool amount follows shortly thereafter (depending on display update rates) and can show an equal dramatic drop, possibly down close to zero.

One prior art method for dealing with the loss of excitement when a jackpot is hit and the respective progressives pool amount is depleted is disclosed in U.S. Pat. No. 5,042,810 to Williams. Briefly, according to Williams '810, one or more "hidden" meters are incremented at the end of each game (e.g., on a roulette table) by a percentage of table turnover during a preceding game and the incrementing "hidden" meters are maintained so as to "replenish" jackpot funds when one or another of jackpots is paid out. This way, the new jackpot pending amount after a hit does not drop dramatically close to zero, but instead is quickly replenished from the hidden replenishment fund. The publicly displayed pool amount follows shortly thereafter to show the replenished amount so as to keep potential players engaged.

Chances for winning any one or more of the progressive jackpot pools can come in various software mediated ways. For example, a player at a slot machine may select or define a straight or other line or other pattern that will operate as an actively-wagered upon pay line/pattern over which, game-generated randomly distributed symbols are evaluated to determine if a winning combination is present (e.g., a sequence defining combination such Jack, Queen, King, Ace, etc. cards, hereafter also J, Q, K, A). If the actively-wagered upon pay line/pattern provides a winning combination, the player is rewarded (e.g., monetarily and/or otherwise). Various outcome enhancing symbols such as wild symbols can appear on the reels, wheels or other symbol presenting mechanisms of the game. Wild symbols typically serve as outcome enhancing substitutes for symbols needed to form a winning combination. In various prior art games, wild symbols: (1) can come into existence by other symbols individually morphing into wild symbols; (2) they can be individually copied from one reel or wheel to another; (3) they can be dropped from an animated character (e.g., cartoon) onto the reels or wheels to individually change certain existing symbols on a scatter distributed basis; and (4) they can populate a reel or wheel more frequently during so-called, free spins. On occasions, a player may be awarded with a wheel spin or other by-chance prize amount selecting mechanism that gives the player a crack at one or more of the progressive jackpot pools (e.g., the mega, medium and/or mini pool). In one example of a by-chance prize amount selecting mechanism, a player who won the primary gaming action (e.g., slot machine poker, table poker) is presented with a lottery-like scratch-to-reveal ticket (a virtual version of one) where the player's task is to scratch off a subset of the possibilities so as to match a set of symbols then presented elsewhere to the player. If he/she succeeds in matching the pattern, he/she is awarded the pending jackpot prize (e.g., $100 if it is a mini-jackpot). Due to such occasional sprinklings of chances at winning one of the progressive jackpot pools, the primary players and adjacent other persons may experience various emotional responses and derive entertainment value from not only the unique ways in which various games are played and game outcomes are developed but also from the chances of winning one of the progressive jackpot pools. As mentioned, the smaller pools such as those deemed to be mini jackpots pay off more frequently.

A problem emerges however, in the case of such smaller and more frequently hit progressive jackpot pools. Two or more players (e.g., two sitting side-by-side at essentially identical slot machines) can hit respective wins for the same mini jackpot fund within a few seconds or less of one another. Because of the speed at which the hidden electronic meters in the gaming devices work, under the rules, one of the players will be awarded the currently publicly displayed mini jackpot amount (say $P(J,t_{h1})=\$50$) and then before the public display gets updated and/or before the next-in-time winner (runner up winner) notices, the metered pool amount drops to zero (or to a de-minimis and hidden replenishment amount) and instead of receiving the last noticed publicly displayed mini jackpot amount (say $50), the runner up winner is awarded the de-minimis hidden replenishment amount (say $P(J,t_{h2})=\$5$ where $t_{h2}>t_{h1}$ and where amount of second award depends on how long ago the hidden replenishment meter(s) were last depleted). Seeing that the last noticed publicly displayed mini-jackpot amount was $50 (as an example here) and the runner up winner gets only $5 (the exemplary replenishment amount), the next-in-time winner (runner up winner) feels cheated. In frustration, that player may hit the operator assistance button or spot a nearby casino agent and call him over. When the casino agent comes as requested, the runner up winner lodges his/her complaint or "dispute". She may say something like, "My machine is broken and not fair. I got exactly the scratch-to-win result as was displayed. It said I would win $50. But instead I got only $5! How can that be?"

Casinos do not like to be caught in such binds where, although the gaming machines operate as advertised, customer relations may suffer for example because customers feel cheated and lodge complaints or keep it to themselves and don't come back in the future. Or worse yet, complain to their friends and discourage them from playing at that casino.

Some of the underlying possible causes for the above exemplary scenario where a customer feels cheated is that too many gaming machines are participating in a single mini jackpot pool ($J_{mini}$) and/or too many players have clustered to use a same bank of gaming machines where those gaming machines are participating in the single mini jackpot pool. The result is that average delay between consecutive jackpot hits ($Avg(t_{h(i+1)}-t_{hi})$) decreases and sometimes jackpot hits occur (due to random chance) within just a few seconds or less of one another (e.g., within a span of about 10 seconds or less). One or more technical solutions to this bind are disclosed herein. Before revealing details of these solutions, some additional background details are provided.

FIG. 1A illustrates part of an automated gaming system 1000 in accordance with the disclosure that includes a wager-based gaming machine 1002 (e.g., a slot machine). The wager-based gaming machine 1002 can include wireless or wired communication interfaces which allow communications with remote servers and/or other devices including a remote services providing network 1004 (e.g., having service providing servers and/or other data storing, communicating and data processing units—not explicitly shown). The services providing network 1004 can provide privacy/integrity-secured services such as but not limited to player tracking and management of progressive gaming. (Some specific network services are described in more detail in conjunction with FIG. 2). The player tracking service and the progressive gaming management service can be parts of a player and prizes accounting system that for example keeps track of each player's winnings and expenditures (including, in some embodiments, player contributions to one or more progressive jackpot pools). In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators/agents or authorized gaming inspectors. A mobile device carried by a primary player (e.g., 1007.1) can be configured to perform gaming related functions, such as functions associated with transferring funds to or from the specific gaming machine 1002 and the primary player's account(s) or functions related to player tracking. In one embodiment, the mobile device carried by the primary player (e.g., 1007.1) can be configured to call for operator assistance and to provide the location of the mobile device so that a casino operator/agent can find the player requesting assistance. A mobile device carried by a casino operator/agent can be configured to perform operator related functions, such as responding to calls for operator assistance, performing hand pays, responding to tilt conditions or collecting metering related information. A mobile device carried by an authorized gaming inspector can be configured to perform inspection related functions, such as actuating software verification procedures.

Use of mobile devices is not limited to secured transactions. In one embodiment, mobile devices may be used for social networking. For example, a primary player 1007.1 may authorize his/her mobile device (e.g., 1006) to automatically interact with a currently used gaming machine 1002 for the purpose of automatically posting to a user-chosen social network various announcements such as, but not limited to, that the primary player 1007.1 has been having fun playing the Lucky Kitty game (a fictitious name for purposes herein) for X hours at the given gaming establishment or that the Lucky Kitty game has just awarded the primary player 1007.1 a symbols upgrade that now gives that player an opportunity to spin for a mega- and/or mini-jackpot and/or other awards. The primary player 1007.1 may alternatively or additionally authorize his/her mobile device (e.g., 1006) to automatically announce (wirelessly) to a selected group of friends or associates that player 1007.1 has just been awarded an opportunity to spin for a jackpot and/or other awards and inviting them to stop by and watch the fun (e.g., as nearby other person 1009 is doing over the shoulder of the primary player 1007.1, where the latter in one embodiment, is seated in chair 1003 situated in front of gaming machine 1002.)

According to the same or an alternate embodiment, the primary player 1007.1 may use his/her mobile device (e.g., 1006) to temporarily reserve the particular gaming machine 1002 for a predetermined amount of time (e.g., no more than say 10 to 30 minutes) so that the primary player may temporarily step away to attend to various needs. While the primary player 1007.1 is temporarily away, the gaming machine 1002 may display a reservation notice saying for example, "This machine is reserved for the next MM minutes by a winning player who was recently awarded a mini-jackpot and a lucky opportunity to spin for the mega-jackpot and/or other awards. Stand by and watch for more such lucky opportunities!" (where here MM is a progressively decreasing time counter). The reservation notice may be prominently posted on an upper display 1012 of the gaming machine 1002 as shall next be described.

The gaming machine 1002 can include a base cabinet 1008 and an upper or top box 1010 fixedly mounted above the cabinet. The top box 1010 includes an upper display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the flag holding Lucky Kitty illustrated at 1012*a*). The animated wheels or reels (e.g., virtual wheel 1012*b*) can be configured to spin and to stop to reveal an occasional opportunity to spin for a jackpot and/or other awards and/or the awarding of a grand prize such as a progressive jackpot 1012*e*. In one embodiment, the predetermined stoppage position or area or awarding of a substantially large prize (e.g., jackpot 1012*e*) may be pointed to by an animated finger 1012*d* of the Lucky Kitty character 1012*a* (or other appropriate animated figure). In one embodiment, a free other hand of the character may hold a signage such as the illustrated flag 1012*c* that shows the current progressive amount (publicly displayed amount) of an identified jackpot pool (e.g., the mini-jackpot). The Lucky Kitty character 1012*a* (or other appropriate animated figure) may temporarily wave an attention getting item such as flag 1012*c*, or wave a virtual fireworks sparkler, etc. at the appropriate times. At other times and/or in other examples, the video content of the upper display 1012 can include advertisements and promotions, such as for example, "A mega-jackpot amount of more than $100,000 was awarded on this machine two weeks ago. Is this a lucky machine for you too?"

In accordance with an aspect of the present disclosure, security measures are automatically and repeatedly taken to assure that only approved software programs are installed and run on or for the slot or other software driven gaming apparatuses. More specifically, in one embodiment, the actual carrying out of gaming actions takes place within the more secure internals of the services providing network block 1004 while the display or signage outputs of a given slot machine (e.g., 1002) are updated afterwards. Although shown as being external of block 1004 for sake mentioning, the secured internals of the services providing network block 1004 may include a progressives accounting block 1004*a* which manages the metering for all ongoing progressive games, a games awarding block 1004c which manages the awarding of prizes to individual players for both non-progressive gaming actions and progressive gaming actions and a database 1004b which records transactions so that they can later be audited on an as needed basis. More details are provided below in conjunction with FIG. 2. Briefly, groups of gaming machines like 1002 are organized as banks (e.g., 3 slot machines per bank) and groups of banks are assigned to different progressive gaming actions. In one example, no more than 6 banks (18 slots) are assigned to any one specific mini jackpot progressive. A reason for such a limitation (and a reason why in accordance with the present disclosure that limitation can be exceeded) will be provided below.

Returning first to a further description of FIG. 1A, in alternate embodiments, the top box 1010 can include one or more mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large (mega-) or smaller jackpots might be won. The wheel(s) can be spun and stopped at particular stopping points to reveal a bonus award situation or a multi-symbol transformation situation (e.g., awarding multiple wild cards, where the latter can increase the chance for winning a jackpot 1012e). In yet other embodiments, the top box 1010 can include a plurality of upper displays that provide similar functions. With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits. Such circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S. Pat. No. 9,830,130 (Random number generator); U.S. Pat. No. 9,792,089 (Random number generator using an incrementing function); U.S. Pat. No. 9,778,913 (Method of generating uniform and independent random numbers); U.S. Pat. No. 9,640,247 (Methods and apparatuses for generating random numbers based on bit cell settling time); USPTO PreGrant 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table. (See also the example of FIG. 3C.)

It will be appreciated by those familiar with gaming environments that participants in various gaming environments (also briefly see FIG. 2) include respective primary players like 1007.1 who are directly using their respective slot machines (e.g., 1002) and are each typically seated on a chair (e.g., 1003) disposed in front of the gaming machine so as to thereby position that primary player's eyes substantially level with a central vertical position (along the vertical Z axis) with a primary game outcome display area 1018 of the gaming machine 1002 thus allowing for a comfortable gaze angle indicated by viewing vector 1007a. The primary game outcome display area 1018 typically being positioned vertically below and slightly spaced apart from the upper video display area 1012. The vertical elevation of the upper video display area 1012 is chosen so as to be easily viewed by adjacent player(s) (e.g., 1007.2) who is/are directly using adjacent slot machines (for example at an eye incline angle shown as viewing vector 1007b) and also to be easily viewed by adjacent bystanders 1009 (e.g., a player's friends) who are standing nearby the primary player or nearby one of the adjacent players or are nearby passers by who happen to be passing by in an area where they can view part of the gaming action(s) of one or more of the slot machines; and in particular the actions displayed by the upper video display 1012 at a comfortable viewing vector 1009a. Due to real or simulated movements of the mechanical reels and/or video reels in the primary game outcome display area 1018 and in the upper video display area 1012, the primary players and the adjacent other persons may experience various emotional responses and derive entertainment value and expectations for further excitement from the unique ways in which the slot game (e.g., the Lucky Kitty game illustrated as an example in areas 1012 and 1018 or other such software driven gaming actions) are progressing. For example, when a low frequency winning hand or winning pattern appears on a wagered-for pay line or pattern presentation area such as 1039 (or a low frequency combination of symbols appears within a predetermined pattern of on-display locations), attention grabbing other symbols (e.g., flashing arrow noted by gaze line 1007a) may be automatically presented on the gaming machine. In accordance with one aspect of the present disclosure, before the primary player 1007.1 spins for the jackpot (e.g., using virtual wheel 1012b), attention grabbing further and larger displays appear on the upper video display 1012 (e.g., "Big Win Possible Here!"—not shown) so they are in the line of sight 1009a of bystanders or other primary players. This can increase emotional levels of all involved and heightened enjoyment of the gaming actions. In other words, a mixture of emotions may be created of both heightened expectations and foreboding that all the expected rewards may or may not be realized. If the primary player 1007.1 continues to win low frequency winning hands such as the King, Ace, Jack, Queen poker hand (K,A,J,Q) shown on line 1039, the expectations for jackpot or like big payouts can increase, thus providing increased entertainment and excitement to those nearby the gaming machine 1002 (and optionally to those on social media who are following the primary player's progress). If high frequency jackpots (e.g., mini-jackpot 1012*e*—as opposed to a larger progressive jackpot, e.g. mega-jackpot with substantially higher possible payout but substantially lower odds of winning it) appear to be hit within a relatively short period of time among a specific bank or banks of machines, that may entice the nearby bystanders 1009 to flock to those machines and start participating in the gaming actions because it appears to the bystanders that such specific bank or banks of machines are extra lucky.

Flocking or clustering of players to a specific bank or banks of machines can have a detrimental effect though. As mentioned above, second player 1007.2 can be sitting at a second slot machine (not shown) nearby to the slot machine 1002 of the first player 1007.1. Both may see the Lucky Kitty 1012*a* holding a $50 current prize flag 1012*c* for the mini-jackpot. Both may hit the mini jackpot 1012*e* within a split second of one another (or within a slightly longer time span, e.g., about 10 seconds or less). However, when the monetary awards are recorded to the individual player accounts, the first player 1007.1 may get the signage-advertised $50 (an exemplary value as shown within flag 1012*c*) while, based on strict adherence to the rules of the game, the second player 1007.2 gets a much smaller amount, say $5 or less. Then a split second later the second player 1007.2 sees the flagged amount (e.g., on flag 1012*c*) drop down to $5 (not shown). The second player 1007.2 will then feel cheated. He/she may voice his/her displeasure at the time (e.g., "Not fair!") or may keep silent. In either case, the casino suffers in terms of customer relations because that customer feels cheated, may not come back and/or may spread the word to friends that the particular casino is not fair. Additionally, the displeased second player 1007.2 may hail an on-the-floor casino operator/agent to lodge his/her complaint. This can cost the casino revenues in various ways. For example, other nearby customers may temporarily halt their game playing actions to watch how the complaint/dispute is handled. In the long run, it would be beneficial to the casino in terms of customer relations and long term smooth running of operations if a technical and automated solution could be found where the complaint/dispute is avoided altogether or at least the rate of such incidents is reduced.

One or more solutions of this type are disclosed herein. However, before delving into the solutions; yet further details for one embodiment are first provided. The base cabinet 1008 of one embodiment includes an internal access entry mechanism instantiated for example as door 1014. The door 1014 swings outward and is coupled to a back portion 1015. The door 1014 includes a locking mechanism 1016. During normal operation, the door 1014 is locked. Typically, unlocking the door 1016 causes the gaming machine 1002 to enter a tilt mode where gaming functions, such as the play of a wager-based game, are not available. This tilt mode can be referred to as a hard tilt.

The cabinet 1008 can include a number of apertures that allow access to portions of a number of devices which are mounted within the cabinet. These gaming devices can include, but are not limited to displays such as 1018 and 1026, speakers such as 1020*a* and 1020*b*, a printer 1022, a bill acceptor 1024, a magnetic and/or chipped card reader 1028 and a resting shelf and/or button panel 1030 including buttons 1032 and 1034. As described in more detail below, these gaming devices can be used to generate wager-based game play on the gaming machine 1002.

In particular embodiments, the bill acceptor 1024 can be used to accept currency or a printed ticket which can be used to deposit credits into an account maintained for the primary player 1007.1 and/or the gaming machine 1002. The credits can be used for wagers. The printer 1022 can be used to print tickets to transfer credits from one gaming machine (e.g., 1002) to another or to monetize accumulated credits. Typically, the tickets can be redeemed for cash or additional game play, such as game play on another gaming machine or at a gaming table.

Figure 2:
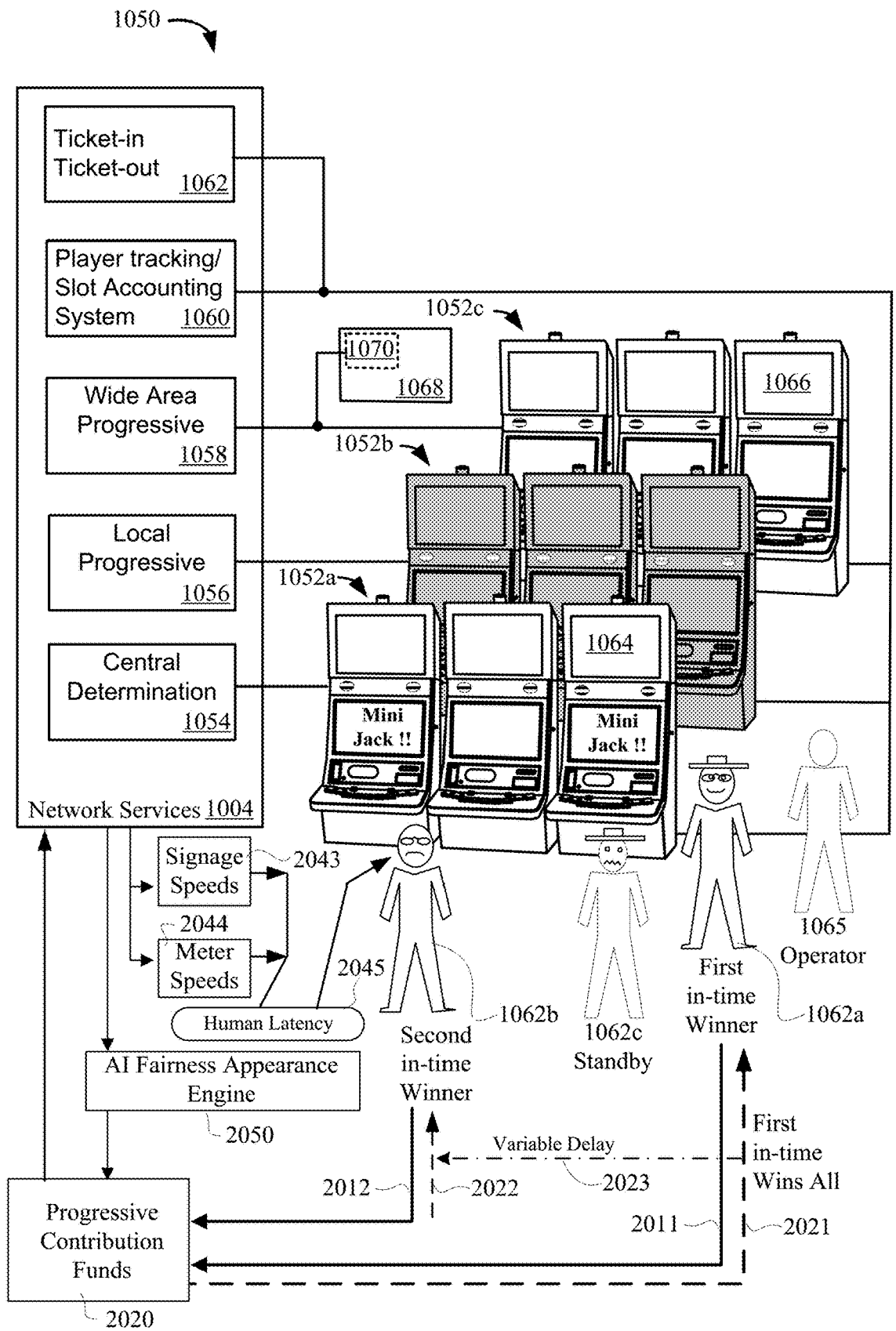
FIG. 2 illustrates a gaming system including three banks of gaming machines that may all participate in a same progressive jackpot pool.

The bill acceptor 1024 and printer 1022 printer can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2A.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary display 1018 or a secondary display such as the one 1026 illustrated to be smaller than and disposed below the primary game outcome display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, the gaming machine 1002 can enter a normal operational mode where game play is again available.

Figure 5:
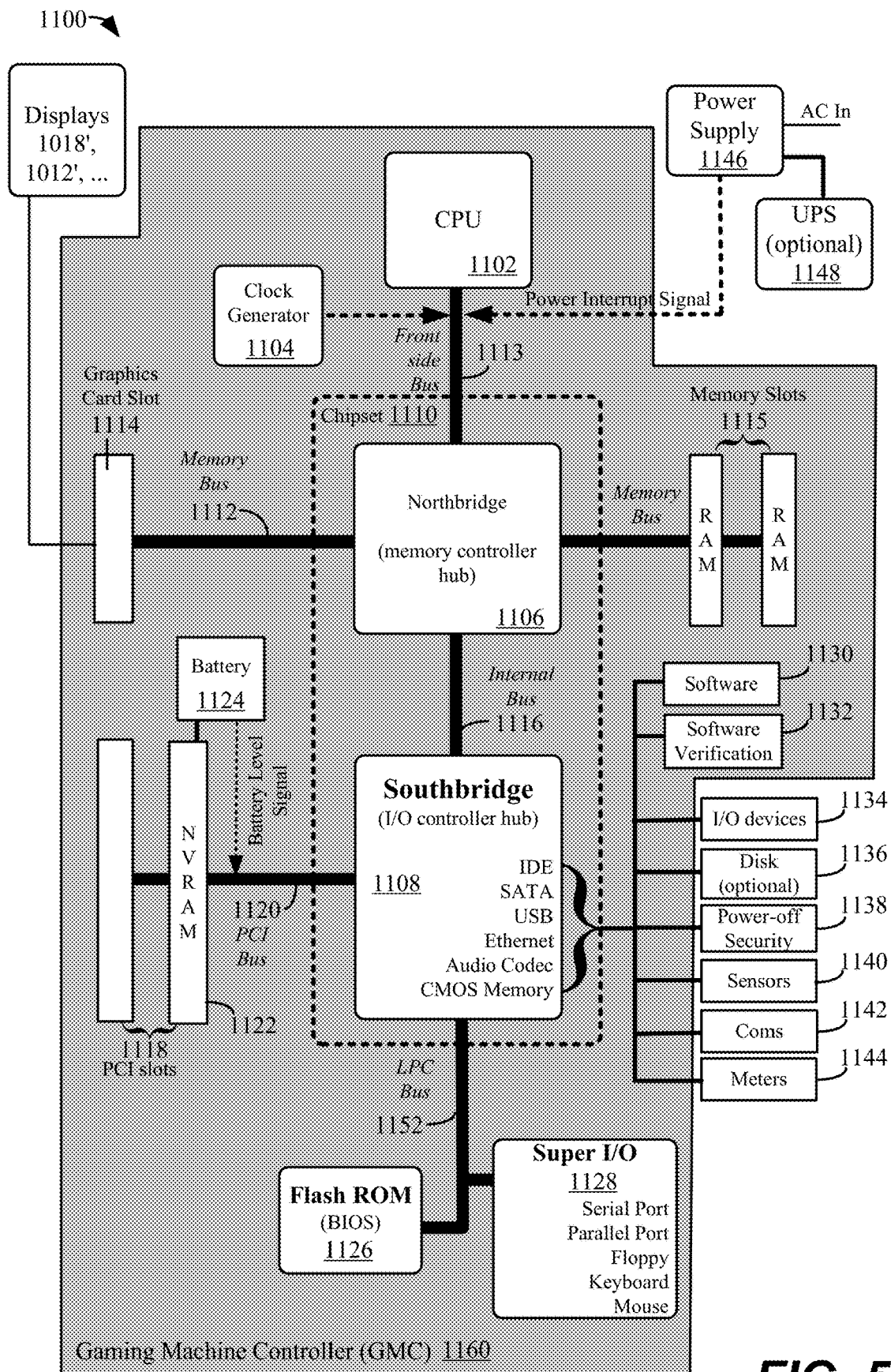
FIG. 5 illustrates a block diagram of gaming machine components including a gaming machine controller in accordance with the present disclosure.

In particular embodiments, the printer 1022 can be coupled to a gaming machine controller (see 1160 in FIG. 5). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks, calling for operator assistance) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. Via this access, devices mounted within the cabinet, such as displays 1018, 1026; speakers 1020a, 1020b; bill/ticket acceptor 1022 or printer 1024 can be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020a, 1020b and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007.1 is seated on it, but also when that player is jumping up and down or otherwise moving in the chair due to heightened emotions. This detected movement can be fed back to the services providing network 1004 for adaptively learning what gaming combinations tend to provide more excitement and/or entertainment. With authorization by the primary player 1007.1, a microphone and/or motion detector on his/her mobile device 1006 may be activated to provide similar automated feedback.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure. Details of the gaming machine controller are described below with respect to element 1160 in FIG. 5.

As another example, a number of security sensors can be placed within the interior of the cabinet 1008. The security sensors (e.g., see 1140 in FIG. 5) can be configured to detect access to the interior of the gaming machine 1002. For example, the sensors can be configured to detect when the locking mechanism 1016 is actuated, the door 1016 is opened or a locking mechanism associated with the gaming machine controller enclosure is actuated. A power source, separate from an external power supply, such as a battery can be provided which allows the security sensors to operate and be monitored when the external power supply is not connected or stops functioning for other reasons.

In particular embodiments, the cabinet 1008 can have a sheet metal exterior designed to provide the rigidity needed to support top boxes, such as 1010 and light kits as well as to provide a serious deterrent to forced entry. For example, the sheet metal can be sixteen gauge steel sheet. Additionally, the door, such as 1014, can be backed with sheet steel in the areas around the displays. Other materials, such as wood, wood composites, can be incorporated into the cabinet and the example of sheet metal is provided for the purposes of illustration only.

Speakers, such as 1020a and 1020b (only two shown, but there can be more elsewhere disposed), can be protected by a metal screen. In one embodiment, a speaker, such as 1020a or 1020b, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the displays, such as 1012, 1018 and/or 1026. The combination of the display and touch screen can be used to perform gaming functions that performed using the button panel 1030. Also, display and touch screen can be used to perform operator features, such as providing a game playback or a hand pay.

The play of wager-based game, such as a slot game, can involve making a wager and then generating and outputting a game presentation. The bet amount can be indicated in display area 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 7.

As an example, a portion of a slot game outcome presentation is shown on display 1018. The slot game outcome presentation can include displaying a plurality of normal reel symbols, such as pointed to by reference 1038 (e.g., blazing sun symbol, wild card symbol, bonus symbol etc.). During the game outcome presentation, the symbols can appear to move on the display 1018 (e.g., vertically to simulate a rotating reel). In addition, symbols can be made to appear to move off the display 1018 and new symbols can be made to newly appear onto the display 1018.

Different combinations of symbols can appear on the primary display 1018 for some period of time, which varies for each instance of the wager-based game that is played. At the end of an action-filled presentation, the symbols can be made to appear to settle and reach a final position or spin outcome. Then an award associated with the game outcome is presented on the display. The total award for the game can be indicated in display area 1044 for example and the total credits available on the gaming machine after the award can be indicated in display area 1040.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of display 1018, 1012 and 1026.

More specifically in one embodiment, when a given spin takes place (e.g., indicated as such in one of display areas 1018, 1012 and 1026), a by-chance bonus awarding wheel 1012b is presented for actuation by the primary player 1007.1 (or by a casino dealer in case of a table game) and when actuated, it starts spinning. As the symbols of the spinning wheel 1012b in the primary display area 1018 start settling into a near-final outcome state, a relatively large horizontal announcement area 1012h may first indicate how close to a jackpot win is the state of the spinning wheel 1012b, and then when the wheel 1012b finally settles into its final outcome state, announcement area 1012h may indicate the win as shown at 1012e (e.g., "Mini-Jackpot!!!) or how close the spin came (e.g., "Missed by one rung!"—not shown). Announcement area 1012h may also be used to indicate the winning of low frequency hands or symbol patterns (e.g., "Royal Flush Here!!"—not shown).

Next, referring to FIG. 2, further details of one embodiment of the network services providing portion 1004 and of gaming machine operations, including organization of plural machines as banks and possible points of weakness due to such organization are described. In FIG. 2, gaming system 1050 includes three banks of gaming machines, 1052a, 1052b and 1052c with three side-by-side slot machines in each bank. The choice of three machines per bank is merely for purposes of illustration. A different number of side-by-side slot machines in each bank could be used (e.g., 4, 5, 6 etc.). What is of importance here is how many machines (or banks of such machines multiplied by the machines per bank factor) can be practically assigned to participate in each high frequency progressive jackpot pool (e.g., mini jackpot pool) without running into problems such as those discussed herein (e.g., increased probability of plural mini-jackpot hits occurring within closing chronological proximity of one another for a same high frequency jackpot pool).

The network services providing portion 1004 includes a central determination server 1054, a local progressives server 1056, a wide area progressives server 1058, a player tracking/slot accounting system server 1060 and ticket-in/ticket-out (TITO) server 1062. In gaming system 1050, all of the gaming machines in each bank, 1052a, 1052b and 1052c, are operatively coupled to the slot accounting system server 1060 and the TITO server 1062. However, for purpose of illustration it is assumed that only the gaming machines in bank 1052a are coupled to the central determination server 1054. Further, it is assumed that only gaming machines in bank 1052b and display 1068 are coupled to the local progressive server 1056. Finally, it is assumed that only the gaming machines in bank 1052c are coupled to the wide area progressive server 1058. The communication couplings between the gaming machines in each bank and the servers

1054, 1056, 1058, 1060 and 1062 can be wired connections, wireless connections or various combinations/permutations thereof.

In various embodiments, the central determination server 1054 can be used to generate a controlling portion of the game played on the gaming machines in bank 1052*a*. For example, the central determination server 1054 can be used to generate random numbers (by any of a variety of RNG techniques including those corresponding to examples mentioned above) used to determine outcomes to the games played in bank 1052*a*. In another example, the central determination server 1054 can be used to generate all or a portion of the graphics used during play of the games on the gaming machines in bank 1052*a*. For instance, the central determination server 1054 can be configured to stream a graphical presentation of a game to a gaming machine, such as that of upper display graphics 1064 and/or of the gaming machine's lower displays. (Lower displays not numbered here because primary player 1062*a* is illustrated obstructing those further displays.) The streamed upper display graphics 1064 may include that which on occasion (e.g., randomly or pseudo-randomly) reveals an active special bonus situation (e.g., Possible Jackpot win Here), reveals the awarding of a substantial prize (e.g., Jackpot!!! 1012*e*). The streamed graphical presentations can be output to respective displays on respective ones of the gaming machines and also to additional larger displays mounted on walls or other fixtures near the respective bank of machines. Because execution of gaming actions within the central determination server 1054 takes priority over the updating of the displays (signages) on the external machines (e.g., those of bank 1052*a*), there may be a slight delay between when an outcome of a specific gaming action is internally determined in the central determination server 1054 and when the displays (signages) on corresponding external machines (or signages on nearby additional displays) get updated to reflect the latest outcomes. This will be referred to herein as signage latency. Signage latency can vary as function of work load placed by higher priority operations on the data processing resources of the network services providing block 1004.

Aside from signage latency there is also human latency 2045. Irrespective of how far behind are the signage update speeds 2043 from the meter update speeds 2044, a given player (e.g., 1062*b*) may fail to take notice of change in what is displayed at various positions on the various signage mechanisms (e.g., video monitors) for example because that player is focused on other positions (e.g., on completing a virtual scratch-and-win ticket—not shown). Thus that player (e.g., 1062*b*) may have last seen the mini jackpot prize as being $P(J,t_{h1})=\$50$ (in the example of 1012*c* of FIG. 1A) and failed to notice that the signage has in the last few seconds or split of a second changed to the new default value of $P(J,t_{h2})=\$5$ after an earlier-in-time first winner of the mini-jackpot (e.g., player 1062*a*) hit that mini-jackpot. Stated otherwise, due to various contextual effects (e.g., distractions, involvements in focus grabbing activities) human latency 2045 for recognizing changed prize amounts can be anywhere from a split second to as much as say, about 10 seconds or even longer depending on circumstances (e.g., due to distractions within the casino environment, due to working on a virtual scratch-to-win lottery like ticket, etc.).

In one embodiment, the central determination server 1054 can be used to randomly generate numbers and/or other symbols used in a bingo type games played on the gaming machine in bank 1052*a*. These bingo type games are often referred to as class II games whereas traditional slot machines are referred to as class III games. In class II games, a draw of numbers (and/or other symbols) is made. The numbers/symbols can be mapped to a bingo card or equivalent, which the player purchases to play the bingo type game and which the player (e.g., 1062*b*) focuses on as the numbers/symbols are called or otherwise published. The announced/published draw of numbers/symbols can result in at least one winning game combination on the bingo type cards participating in the current bingo type game. In some games, the first player to recognize and call (or otherwise publicly indicate) his/her completion of a bingo like pattern wins the entire prize (a winner takes all rule for the first-in-time winner). In some other games, all the players who recognize and call their completion of a bingo pattern within a predetermined first time window after the last bingo number was announced, split the prize or all win the same prize amount. In yet other games, the machine system automatically determines who the winners are without need for player recognition and call indication. However, even under such rules and strict adherence to them, some players may feel they were cheated by being cut out of the winners pool because those players perceived that they should have been included in the winners pool. In accordance with the present disclosure, for the sake of maintaining good customer relations and smooth running of casino operations, the casino may elect to effectuate a second or smart-awards time window whose duration is based on context (e.g., detected distraction events within the casino environment) and to pay the players who fit in the second, smart-awards time window out of a smart-awards reserve fund as described in more detail elsewhere herein.

The central determination server 1054 can be configured to repeat the number draws for the bingo type games at regular intervals. For example, number draws can be repeated every 20 milliseconds or according to a longer interval period. Players at the various gaming machines coupled to the central determination server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as on display 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award (e.g., because the player's call of bingo came after the strict adherence timing window closes), then the video reels can be displayed spinning and a reel combination associated with no award in the slot game can be displayed on the gaming machine. This process can be repeated on various participating gaming machines, as number draws for various bingo games are initiated and completed on the central determination server 1054. However, as mentioned above, in some instances (e.g., based on detected context) and for the sake of maintaining good customer relations and smooth running of casino operations, the casino may elect to effectuate a second or smart-awards time window whose duration is based on context (e.g., detected distraction events within the casino environment) and to pay the players of the bingo type game who fit in the second, smart-awards time window out of a smart-awards reserve fund as described in more detail elsewhere herein even though they do not qualify according to the strict adherence timing rules.

The local progressive server 1056 can be used to generate one or more progressive prizes that are limited to a local group of gaming machines, such as only the gaming machines in bank 1052b. When games are played on the gaming machine in bank 1052b, an amount of each wager (a predetermined or variable fraction) can be contributed to one or more progressive prizes that accumulate in a respective progressive contribution fund 2020. The local progressive server can receive the contribution amounts from the gaming machines linked to the progressive game and can keep track of the prize amounts associated with the one or more progressive prizes. The prize amounts valid at around time t (e.g., $P(J_1,t)$, $P(J_2,t)$, $P(J_3,t)$, etc.) for the one or more progressive prizes can be output to displays on the participating gaming machines as well as to separate displays (signages) near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052c and display 1066. The wide area progressive server 1058 can be used to enable a progressive game played on gaming machines distributed over a wide area, such as multiple casinos distributed within a state or other such jurisdiction. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount. In some instances, due to differences between meter update speed (2044) and signage update speed (2043), the displayed as current jackpot amount may be incorrect because a split second earlier, one of the players (e.g., 1062a) may have already won the jackpot. Other players (e.g., 1062b) who are looking to the slow-updated displays (e.g., 1068) may feel cheated if the late displays show (or seem to have just shown) a higher amount (e.g., $50) and yet that not-first-in-time winner is awarded a lower amount (e.g., $5).

In general, displays with digital sign controllers can be provided throughout a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, A, J, Q) and follow up bonus award opportunities. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062a (User 1062a can be playing games at one or more of the gaming machines in bank 1052a.). The player tracking account information can include a player's name, address, phone number, gender, etc. It is to be understood that the graphics presentations on any given gaming machine can be structured for entertainment and heightened emotions and/or expectations of not only the primary player 1062a but also for that of nearby other persons 1062b.

In one embodiment, a player, such as user 1062a, can insert a player tracking card in a card reader (e.g., see card reader 1022 in FIG. 1A). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1A, the gaming machine 1002 may be able to communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1A, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1A) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062a.

As an example, when a printer, such as 1022, is employed in a "cash out," the gaming machine controller (e.g., see 1160 in FIG. 5) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1A). Then, the printer can print a ticket with the unique number, such as a unique number encoded in a bar-code, and a value of the ticket, such as five dollars.

When the ticket is later presented for redemption, the unique number can be used to validate the ticket. For example, the user 1062a can "cash out" at a first gaming machine, such as 1064 in bank 1052a, and receive a printed ticket with a unique number generated by the TITO server 1062. Then, the user 1062a can go to a gaming second gaming machine, such as 1066 in bank 1052c, and insert the ticket into a bill acceptor (e.g., see 1024 in FIG. 1A). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052a. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as those of displays 1064 or 1066, are operational, a user such as 1062a or 1062b can engage in game play. Under some conditions, such as tilt conditions, game play can be suspended and an intervention by an operator, such as 1065, may be required. An operator intervention may require an operator, such as 1065, to be directly present at a gaming machine, such as that of display 1064. For example, the presence of an operator may be required to access an interior of the gaming machine to clear a tilt condition. In other examples, an operator may be able to clear a tilt condition from a remote location via a near field or other communication coupling with the gaming machine (e.g., using a mobile device such as 1006).

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1A, 2, 7 and 8 an operator, such as 1065, may be required to be physically present at a gaming machine, such as 1064 and 1066, to clear a tilt condition and/or to deal with other customer needs or desires. For example, to clear a tilt condition, the operator, such as 1065, may have to access an interior of a gaming machine to clear a paper jam in a printer or a bill acceptor (e.g., see printer 1022 and bill acceptor 1024 in FIG. 1A). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1065 may access a menu output on a main display of the gaming machine, such as 1064 or 1066, to perform a RAM clear. RAM clears are described in more detail below with respect to FIG. 5. In yet another example, one or more customers may feel that they have been cheated based on their perception of when certain timing windows closed or certain prize amounts changed and they may wish to lodge complaints or disputes with the operator.

As earlier mentioned, the various data processing devices (e.g., 1054-1064) in the network services providing block 1004 and in the individual slot or other software driven gaming apparatuses (e.g., 1052a-1052c) or combinations thereof are generally dependent on called upon and executed software programs (not individually shown) where the actual gaming action runs rapidly and is recorded on official "meters" within a secured part of the system. Non-official displays or other signages (e.g., 1068) may thereafter get updated on slower basis as system data processing bandwidth permits. The execution of the official gaming actions takes priority. A conventional installation of one or more software programs for carrying out the official gaming actions may proceed as follows. One or more software coding persons or code updating persons generate corresponding pieces of source code. The generated source code or codes are compiled by an automated compiler. Installable object codes produced by the compiler are transmitted to a build assembler. The build assembler creates an installation build from the received object codes and transmits the installation build to an appropriate automated software installer (not shown). At install time, the software installer automatically copies the to-be-installed object codes into one or more respective portions of the network services providing hardware 1004 and at the same time generates respective SHA-1 hashes of respective segments of the being-installed object codes. The generated SHA-1 hashes are automatically stored into corresponding records within a database server (not shown).

After installation, an automated software verifier may be activated and used for comparing hashes of the installed software segments (which should be the same as corresponding segments of the compiled code) against the respective hashes that had been stored in the database server. If all of the compared hashes match, then the installed software segments are deemed ready to be run (executed) within the network services providing hardware 1004 and/or in whatever destination data processing units (e.g., in respective ones of gaming apparatuses 1052a-1052c) they are predestined to be transmitted to by way of a secured transmission mechanism (not shown). In one embodiment, each time new or updated software is to be installed in the network services providing hardware 1004, a government official or other authorized agent/inspector authorized to do so, is called in to oversee the installation process and to obtain as an output of the software installer of its generated SHA-1 hashes in the form of a GLI certification letter that is in compliance with the latest government requirements and includes an unalterable copy of the SHA-1 hashes created for the respective segments of the received and installed object codes. In this way the integrity of big ticket jackpot runs may be preserved.

Thereafter, the government official/agent may return at any time to run the software verifier for the purpose of accessing respective segments of the installed object codes within the network services providing hardware 1004 and automatically generating SHA-1 hashes for those accessed respective segments of the installed object codes and then comparing the generated hash values against the SHA-1 hashes in the GLI certification letter to thereby verify that nothing has changed.

Casinos can attest to the fairness of their gaming machines (e.g., strictly adhering to the advertised game rules and procedures) by referring to the GLI certification letter and/or the periodic government inspections. Nonetheless, due to varying latencies and race conditions, some players may come to feel or otherwise perceive themselves as having been cheated. One example is illustrated in FIG. 2. First and second players 1062a and 1062b are playing a same progressive prize game (e.g., a mini-jackpot) whose current accumulated amount is displayed on a slow-to-update, large public screen 1068. According to the rules of the progressive prize game, a same fraction or same absolute portion amount (2011, 2012) of placed wagers is taken out of the initial ante amounts of each of the players (e.g., 1062a and 1062b) and contributed into a growing, main progressive fund 2020. Also according to the rules of the progressive prize game, whichever of the players (e.g., 1062a and 1062b) hits the jackpot first is to be awarded the entire amount of the currently accumulated funds in the main progressive fund 2020. Thus if the first player 1062a hits the jackpot first in time, that first-in-time winner 1062a draws the full current amount 2021 out of the main progressive fund 2020. Theoretically, a not-first-in-time follow-up winner 1062b who hits the same jackpot a split second later may draw a zero amount 2022 out of the now depleted progressive fund 2020. However, as mentioned, to avoid this situation, a back-up replenishment amount (not shown separately) is may be built up on the side so that the second-in-time winner 1062b will not be completely disappointed and is awarded the backup replenishment amount. In the given example the second-in-time winner 1062b draws $5 (2022) from the automatic back-up replenishment amount that is developed as one of the accumulated progressive funds 2020 besides the main progressive amount.

Although the above "replenishment" procedure provides for a reduction in the disappointment that a second-in-time winner (e.g., 1062b) may feel, it does not alleviate the feeling of having been cheated that certain players may experience due to human latency 2045 and/or due to signage latency (e.g., slow signage speeds 2043). More to the point, if a variable delay 2023 between when the true first-in-time winner (e.g., 1062a) hits a high frequency jackpot and when one or more not-first-in-time winners (e.g., runner up winner 1062b) participating in the same game hit respective wins for the same high frequency jackpot providing game is less than a predetermined threshold (e.g., less than about 10 seconds) there can be a high probability (e.g., greater than 30%, greater than 50%) that the runner up winners (e.g., 1062b) will feel cheated due to human reaction latency 2045, due to signage latency 2043 and/or due to other factors. This can be especially true in cases where a third player (not shown) hits a jackpot win condition just a split second after the second-in-time winner 1062b. If the replenishment fund is depleted at that moment, the third-in-time winner will get zero and feel truly cheated. So the problem is not solved by having an automatic replenishment fund. Additionally, as mentioned herein, various contextual parameters (e.g., local distractions, attention grabbing activities, etc.) may influence player perceptions and when and to what extent they feel they did not get fair treatment.

The above split-second-apart hits problems almost never happen for mega-jackpot games. That is so because the average delay (the average value of variable delay 2023) between winning hits is on the order of many hours or days. However, when it comes to high frequency mini jackpots and the like, the average delay between winning hits may be on the order of minutes apart or less. In truly random systems that means that winning hits can at times cluster to be just seconds apart or less (e.g., split seconds apart). In the latter case, the probability that some players may perceive themselves as not having received fair treatment can increase significantly. It may be advantageous to the casino in such instances to play it smart, not stick with strict adherence to the rules even though such strict adherence favors the casino in instantaneous monetary terms and instead provide for better customer relations and smoother running of on floor operations by voluntarily providing smart-awards out of a built up smart-awards reserve fund as shall be detailed below.

First however, and referring to FIGS. 1B and 1C, some basic concepts about statistics are explained. While human intuition (e.g., common sense) might lead one to believe that truly random events (e.g., locations of winning machines) should be homogenously distributed about the area of the casino floor (e.g., an X versus Y plane) as presented in FIG. 1B, in truth the homogenous distribution of FIG. 1B is just one of many possibilities and clustered spatial distributions such as that of FIG. 1C are at least equally if not more likely to occur. The same is true when it comes to chronological distribution. While human intuition (e.g., common sense) might lead one to believe that truly random events (e.g., timings of wins) should be homogenously distributed as presented in FIG. 1C, in truth the homogenous distribution of FIG. 1C is just one of many possibilities and clustered chronological distributions such as that of FIG. 1D are at least equally if not more likely to occur. Both of FIGS. 1C and 1D show a same "average" chronological distribution of wins. It is cases like that of FIG. 1D (clustered chronological distributions of wins) that can lead gaming players to feel cheated even though the casino is fully complying with the rules.

FIGS. 1B and 1C have a second purpose here. Assume that instead of showing locations of winning machines they are showing locations of "played" machines. Depending on culture, common sense might indicate that players would want to evenly space themselves apart as indicated in FIG. 1A. However, for various cultural, psychological or alike reasons, players instead tend to flock together in clusters as indicated in FIG. 1B. One reason might be that the players have decided in FIG. 1B that the "luckier" gaming machines are on the left side of the dash-dot dividing line. Both of FIGS. 1A and 1B show a same "average" spatial distribution of played machines. It is cases like that of FIG. 1B (clustered spatial distributions of played machines) that can lead gaming players to feel cheated even though the casino is fully complying with the rules.

More specifically, assume for the case of FIG. 1B (clustered spatial distribution) that the dash-dot dividing line represents a boundary between machines participating in respective first and second mini jackpot progressives (e.g., $J_{mini\_1}$ and $J_{mini\_2}$). The average time delay between wins will be very large on the right side (because no one is playing). By contrast, the average time delay between wins on the left side of FIG. 1B (clustered spatial distribution) will be significantly smaller and the likelihood of clustered chronological distribution of wins such as that of FIG. 1D will be correspondingly higher. Moreover, as average time delay between wins decreases on the left side of FIG. 1B, more players will tend to flock to those, apparently "luckier" gaming machines and the average time delay between wins on the left side of FIG. 1B will grow even smaller. A vicious cycle is created.

In addition to causing some players (e.g., not-first-in-time winner 1062b) to feel cheated at times, chronological clustering such as that represented in FIG. 1E constrains casinos from having too many gaming machines (or too many banks of such machines) all participating in a same high frequency progressive jackpot pool (e.g., a mini-jackpot). It has been observed that the chance occurrence of chronological clustering becomes too severe for certain mini jackpot pools when more than about 18-20 slot machines all participate in such mini jackpot pools. This puts a constrain on casinos with respect to how many same gaming machines they can install in same sectors of the casino floor for all participating in a same high frequency progressive jackpot pool. That in turn puts a constrain on possible revenues at times when the casino is crowded and a large flock of players all decide they want to play a certain one of the high frequency progressive jackpot games at one time.

In accordance with one aspect of the present disclosure, an artificial intelligence (AI) learning machine 2050 (FIG. 2) is integrated into the system to predict when and where excessive chronological clustering (e.g., FIG. 1E) and/or other causes (e.g., on-floor distractions) are likely to occur which have a high likelihood (e.g., greater than 50%) of inducing a predetermined proportion of customers (e.g., greater than 50%) to feel cheated or otherwise unfairly treated. The AI learning machine 2050 is configured to preemptively prepare for such occurrences by prefunding one or more "smart-awards" or "maintenance of appearance of fairness" funds to cope with such excessive chronological clusterings and/or such other causes and to use the one or more proactively-funded "smart-awards" funds to pay off not-first-in-time winners (e.g., 1062b) with the same mini jackpot award amount (or other high frequency progressive jackpot pool award amount) as is paid to the true first-in-time winner 1062a if such runner up winners (e.g., 1062b) hit their respective win conditions within a predetermined time span (a smart-awards time window, e.g., within about 10 seconds of less) after the first-in-time winner 1062a hits for the same high frequency jackpot fund.

Figure 3A:
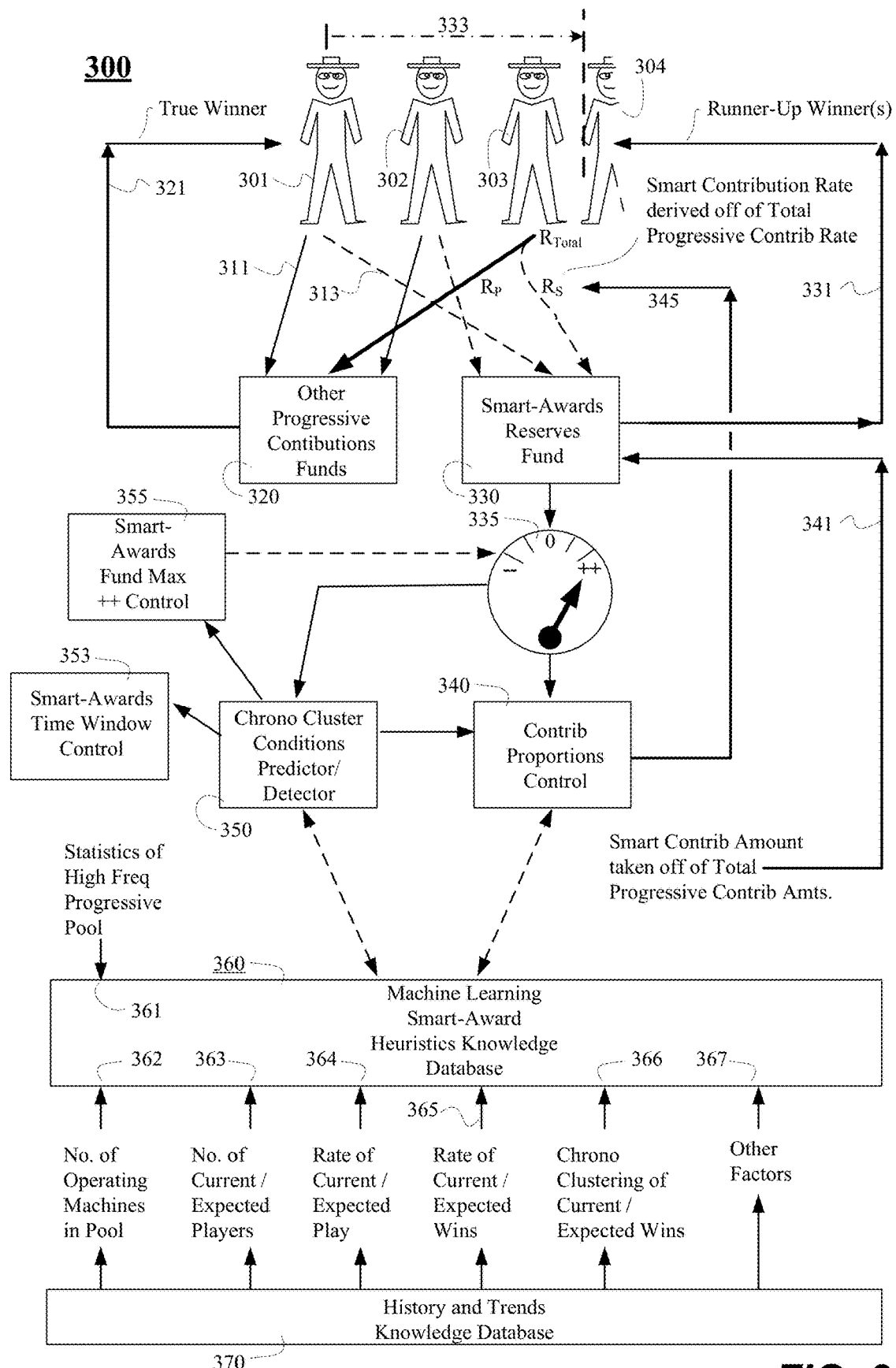
FIG. 3A illustrates an automated machine system in accordance with the present disclosure that is configured to create an appearance of fairness for runner up winners who participate in a progressive jackpot pool having a relatively high hit rate (e.g., one hit and win on average every 20 seconds or so but can at times cluster into a span of say one hit every 10 seconds or less).

Referring to FIG. 3A, shown are details of a smart-awards providing system 300 in accordance with the present disclosure that is configured to provide casino-volunteered compensation for close-in-time runner-up winners participating in high frequency progressives (or other gaming actions where close call timings (e.g., bingo type games) can result in degraded customer relations) when their respective hits (or bingo type proclamations) come close in time to, but subsequent to the jackpot hit of the true first-in time winner 301 (or subsequent to the close of a predetermined bingo type proclamation window). Variable time window 333 determines which further and subsequent run-up winners e.g., 302 and 303 are to be compensated out of a smart-awards reserves fund 330 and which even later winners (or bingo type proclaimers) are not to be so compensated. In the illustrated example, subsequent runner-up winner 304 does not make the cut off for the smart-awards compensation window 333 and thus does not get compensated from the smart-awards reserves fund 330. (However, the post-window jackpot winner 304 will be awarded a prize out of the main progressive contributions fund 320 after that fund 320 has paid off the first in time winner 301 and then at a time point after time delay 333 when the main progressive contributions fund 320 has been replenished by further funds kept in a replenishment fund (not shown).) Also, the first-in time winner 301 is not considered to be "within" the smart-awards time window 333 and instead the timing of his/her hit ($t_{h1}$) marks the start of the smart-awards time window 333.

Additionally, although FIG. 3A shows just players 301-304 and not the respective gaming machines that they are using, it is to be understood that each of the illustrated players 301-304 also represents the gaming machine or machines (or computer-augmented gaming action tables) that the respective player is using and that the illustrated communications of signals (e.g., for moving funds around such as at 321 and 331) are generally machine-to-machine communications. Any one or more of the illustrated players 301-304 can be using two or more gaming machines at the same time. In one embodiment, if two or more of the gaming machines that a same player uses hit the same jackpot within the smart-awards time window 333, the situation will be treated as if two different players so hit the jackpot. In an alternate embodiment, if two or more of the gaming machines that a same player uses hit the same jackpot within the smart-awards time window 333, the situation will be treated as if only the first-in-time hitting machine is eligible for the smart-awards compensation fund and the other(s) are not. In one embodiment, each of the gaming machines participating in the respective chance-at-the-jackpot providing game (or bingo type game with required player proclamation of a hit) has or uses a respective one or more synchronized meters that are synchronized to a common clock signal (e.g., one provided over a network) and the moment of jackpot hit by each respective gaming machine is time stamped with a timing derived from the common clock signal and recorded as such for the meter recorded hit. In one embodiment, the moment that a player commits him/herself to a wager that contributes to a given progressive jackpot pool is deemed as the time stamped moment for a corresponding hit even if determination that the hit has occurred comes later. In one embodiment, the location (e.g., utilized gaming machine identification) of the wager commit is recorded in association with the time stamped moment.

Figure 3B:
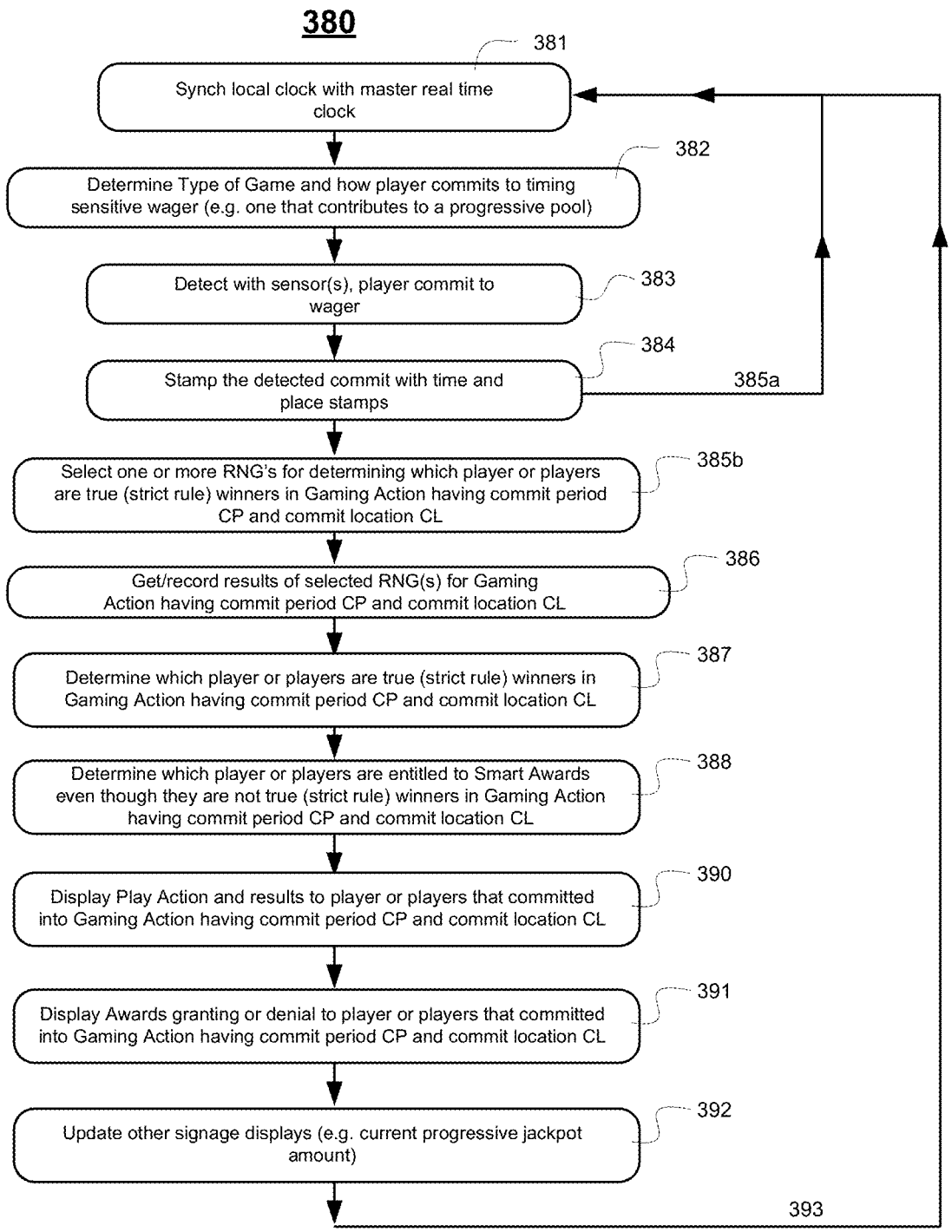
FIG. 3B illustrates a method for determining timing of wins by respective players.

Referring to FIG. 3B, an example method 380 is shown for illustrating how the timing of a wager commit can be used for determining the timing of a progressive hit of a specific one or more players. At step 381 a local real time clock of a respective gaming machine is synchronized with a master real time clock of an encompassing environment (e.g., the casino floor). At step 382, a determination is made of the type of game being played and how the associated player may commit to a timing sensitive wager such as one that contributes to a progressive pool or requires active player proclamation of a winning result (e.g., a bingo type game). The commitment to wagering on the gaming action outcome can come in one or more of various ways including, but not limited to the player pressing a pushbutton or pulling down on a lever, the player making a unique hand or other body gesture, the player dropping casino chips onto a predetermined sensor area and/or the player voicing one or more unique verbal commands. Step 383 represents the detection with aid of one or more appropriate sensors of the time that the commit to the wager is made by the specific player. At step 384, the identification of the player is combined with a timestamp of when the commit was made and optionally with further stamps identifying the gaming machine and its location. Part of the process flow then loops back as a parallel process flow 385a to step 381 for repeated synchronizing of the clocks and repeated detection of further wager commits (e.g., the player commits to wagering on outcomes of other displayed reel lines, spendable wheels or card table outcomes).

At step 385b (which can proceed in parallel with loop 385a), one or more RNG's are selected and used for determining gaming action outcome for a respective wager commitment period (CP) and a respective one or more gaming machines or location of banks of such machines (CL is commit location). The results of the selected one or more RNG's are used for determining which one or more players are the true (according to strict rules of the game) winners of the gaming action that took place for the respective commit period (CP) and location (CL). The commit period (CP) and location (CL) may be co-associated with a specific jackpot pool prior to a winning hit being declared for that pool.

Step 386 represents the fetching and recording of the results for the respective gaming action when using the selected RNG's. Step 387 represents the determining of which one or more players are the true (according to strict rules of the game) winners of the gaming action that took place for the respective commit period (CP) and location (CL).

At step 388 and in accordance with the present disclosure, a further determination is made based on recorded commit timestamps and wagering locations as to which additional players are entitled to smart awards even though they are not true (strict rule) winners of the gaming action as was determined at step 387. One of the reasons that a casino may elect to voluntarily give out such smart awards even though not required by the strict rules of the game can be to maintain good customer relations and/or smooth continued operation on the gaming floor (e.g., avoiding disputes, calling over of the casino floor agent and/or creating disruptions due to upset players).

At step 390, although the results of the gaming action have already been determined in preceding steps 385b-388, animated displays are provided to the players showing a progression to the predetermined gaming action outcomes. The animated displays may include one or more of spinning of virtual reels, of mechanical real reels that are electronically controlled, spinning of virtual wheels and/or spinning of mechanical wheels that are electronically controlled. At step 391 after the animated displays settle into their final outcome states, further displays are provided to the respective players indicating the granting or denial of respective awards to the players who had committed to wagering on the gaming action (e.g., the one having commitment period CP and location CL). In one embodiment, the displayed awards include the smart awards that are voluntarily given to players who are not true (strict rule) winners but nonetheless fit into the current smart awards timing window.

Typically, the displaying of the granted awards is provided first at the signage outputs of the local machines where the respective players are engaged. Subsequent to that and as indicated at step 392, other signage outputs such as larger displays on the casino walls may be updated with the latest progressive or other pool amounts. As explained above, sometimes of the updating (e.g., step 392) of the larger displays lags behind the awarding of the respective prizes by a human discernible amount of time. This can lead to some of the upset discussed above where a player sees a relatively large jackpot amount (e.g., $100) displayed on the large wall signage but then receives a smaller amount (e.g.,$5) when perceiving him or herself as having hit the jackpot an instant later. The automated machine-granting of voluntary smart awards helps to smooth customer relations and avoid disputes and upset.

In one embodiment, the machine-implemented determination as to which gaming machine hit the jackpot first and which subsequently and in what order after is based on the recorded time stamps of the respective recordings in the respective meters. In one embodiment, the time stamping mechanism has an accuracy of at least 1/100 second or less so that split second determinations can be made as to which gaming machine was first to hit a respective jackpot, which was second and so on and also which gaming machines have their hits falling within the smart-awards-providing time window 333 and which do not. In one embodiment, the time stamping mechanism automatically records the time of the jackpot hit, the identification of the progressive jackpot pool (e.g., $J_{mini\_034}$) and the identification of the gaming machine which is associated with that hit.

Figure 3C:
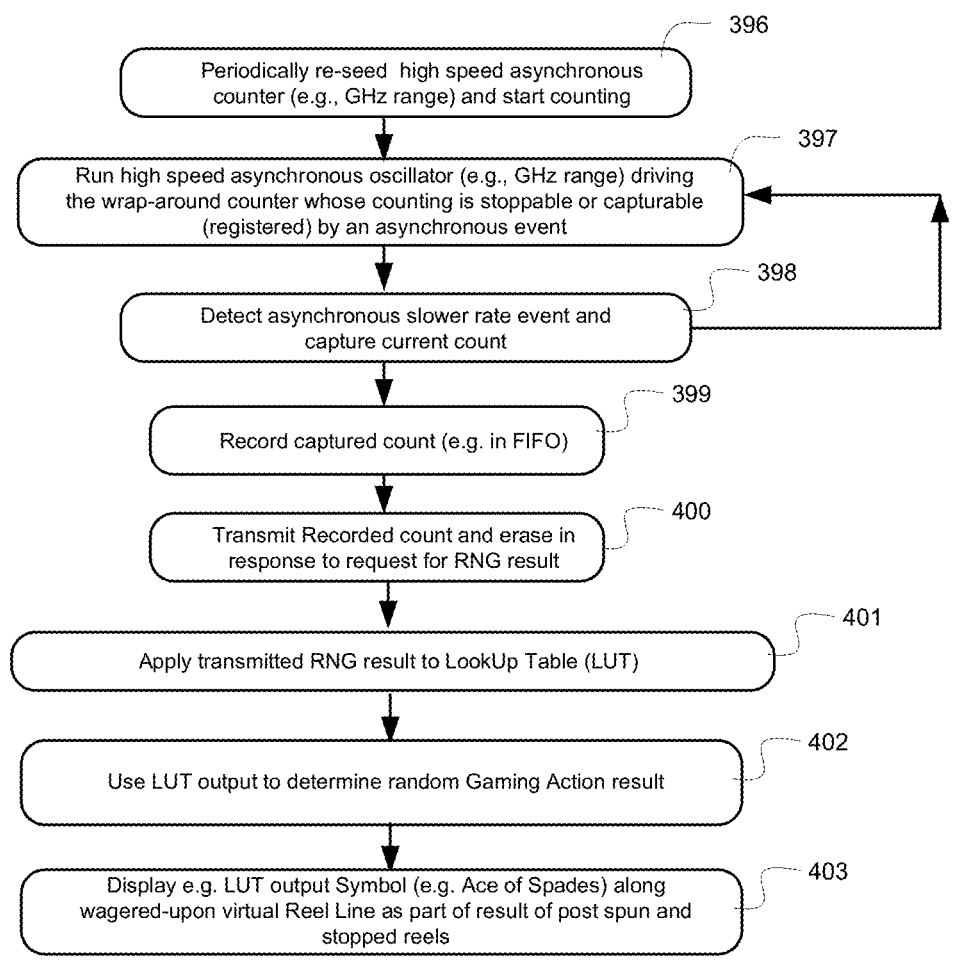
FIG. 3C illustrates an exemplary random number generation method and use thereof.

Referring to FIG. 3C, shown as a non-limiting example is a method 395 of using a random or pseudorandom number generator (RNG) for determining gaming action outcome. At step 396 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step 397, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step 398, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO). In one embodiment, the FIFO is a circular one of limited size whereby unused recorded counts are overwritten by newly captured random count values. At step 400 a request is received for an orangey result and in response the count value at the output end of the FIFO is transmitted to the requester. The transmitted count value is erased from the FIFO.

In step 401 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step 402, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step 403, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure (e.g., 1004) where the graphics for the gaming action are also generated and the graphics are transmitted by secure communication links to the local gaming machines in the respective banks.

Returning to FIG. 3A, A current balance meter 335 is provided for the smart-awards reserves fund 330. In accordance with one aspect of the present disclosure, the current balance meter 335 is allowed to go negative. Moreover, the current balance meter 335 has a variable positive saturation level (++) which, when hit, shuts off a contributions taking feed 341 which feeds accumulating contributions into the smart-awards reserves fund 330. A contributions proportions control 340 determines the rate $R_S$ of the smart-awards contributions feed when the current balance of meter 335 is below its positive saturation level (++). Proportions control 340 sets the rate $R_S$ of the smart-awards contributions feed higher when the balance is negative or close to zero. Conversely, the proportions control 340 sets the rate $R_S$ of the smart-awards contributions feed lower as the balance in the smart-awards reserves fund 330 nears the currently set positive saturation level (++). The rate $R_S$ of the smart-awards contributions feed is switched to zero when the currently set positive saturation level (++) is attained or exceeded.

Drawing of proceeds from the illustrated funds, 320 and 330 occurs as follows. Contributions $R_P$ to the main progressive fund (inside block 320) continue to be taken from each of the players participating in a current progressive jackpot pool until a true, first in time winner (e.g., player 301) is recognized by the gaming determination controller (e.g., 1054 of FIG. 2). As the same time, smaller contributions $R_S$ are taken from each of the players participating in the current progressive jackpot pool to feed the smart-awards reserves fund 330 as long as the current balance indicated by meter 335 is below the currently set positive saturation level (++). The total amount of contributions $R_{Total}$ taken from each of the participating players and the fractions (e.g., $R_P$, $R_S$) that are fed off from that total to build up respective accumulated funds in the main progressive contributions fund(s) 320 and in the smart-awards reserves fund 330 are determined by a contributions proportions control 340. contributions control signal 345 establishes the total contributions $R_{Total}$ and split fractions (e.g., $R_P$, $R_S$) thereof that are fed from each of the participating players (e.g., 301-304). Although FIG. 3A shows the labels $R_{Total}$ and $R_P$, $R_S$ only for player 303, it is to be understood that such is for sake of minimizing illustrative clutter. Solid contribution line 311 represents the contributions of first player 301 to the progressive contribution funds 320 while dashed contribution line 313 represents the contributions of first player 301 to the smart-awards reserves fund 330. Similarly for second player 302, his solid contribution line (no reference number) goes to the progressive contribution funds 320 while his dashed contribution line (no reference number) goes to the smart-awards reserves fund 330. The same will be true for partially shown fourth player 304.

When the first in time winning player 301 is determined to have hit the jackpot prize (e.g., the mini jackpot prize), a countdown clock is started for timing out the currently set smart-awards time window 333. The full and publicly advertised proceeds 321 currently held in the main progressive fund (320) but not held in any hidden replenishment funds (also in block 320) are paid out to that first in time winning player 301. The value of the payout amount 321 is saved in memory. Then a determination is made as to which, if any, of further players participating in the same progressive jackpot game hit their respective wins for a jackpot within the currently set smart-awards time window 333. In one embodiment, a same payout having the value of the payout 321 awarded to the first player 301 is awarded to each of the runner-up winners (e.g., 302 and 303) that have hit their respective wins for a jackpot within the currently set smart-awards time window 333. Proceeds to pay off these runner-up winners are taken out of the smart-awards reserves fund 330 even if that causes the balance (indicated by meter 335) of that fund to go negative. The duration of smart-awards time window 333 is preferably set such that runner-up winners within that window 333 will likely (e.g., probability greater than 30%, 50% or other) feel cheated if not awarded the most recently publicly displayed jackpot amount (e.g., on public display 1068 of FIG. 2) and such that the next subsequent runner-up (e.g., player 304) just beyond that smart-awards window will likely not feel cheated by having missed the publicly advertised jackpot award that the first in time winning player 301 received.

As mentioned, in one embodiment the duration of the smart-awards time window 333 is variable. In accordance with one aspect of the present disclosure, artificial intelligence rules (e.g., expert rules) as maintained within a smart-awards heuristics knowledge database 360 are used to drive a smart-awards time window control 353 where the latter control can vary the duration of the smart-awards time window 333 according to current or predicted (expected) context. That context can vary for many reasons, including but not limited to: (a) the average age of players currently populating the machine banks that are participating in the respective progressive for which the smart-awards reserves fund 330 is being maintained; (b) the current level of noise and/or other distractions present in the location of the participating machine banks; (c) number of people crowding into the area of the participating machine banks; (d) nature of the award deciding mechanism (e.g., 1012b of FIG. 1A); (e) an estimated average intoxication level of the players currently populating the machine banks; (f) an estimated current dominant cultural attribute of the players currently populating the machine banks; and (g) the current signage update latency (see 2043 of FIG. 2). More specifically, human reaction latency (2045 in FIG. 2) may vary as a function of one or more of these attributes such that the player is currently occupying the location of the participating machine banks failed to recognize that the offered progressive jackpot amount has changed and thus they feel cheated when they do not receive what they perceive to be the publicly advertised jackpot amount (e.g., on public display 1068 of FIG. 2). It can often be worthwhile to the casino to voluntarily pay off the lower valued ones of the high-frequency jackpot pools to all players who hit within the respective smart-awards timing windows of those jackpot pools as opposed to sticking strictly to the game rules allowing for a high probability that some or all of the players who hit within the respective smart-awards timing windows (333) will feel cheated, lodge a complaint and/or relay to their acquaintances that the casino does not appear to operate fairly.

The setting of the positive saturation level (++) by a corresponding smart-awards fund maximum saturation control 355 is also a function of AI heuristics determination (e.g., provided by machine learning within knowledge base 360). Rather than waiting for meter 335 to go negative and then aggressively contributing to the smart-awards reserve fund 330 (by driving contributions rate $R_S$ high), the system preferably predicts preemptively when the context of the machines participating in a respective high-frequency progressive will change such that a higher positive saturation level (++) is desired. For example, if historical trends (kept in a history and trends database 370) indicate that large crowds tend to flock in to play the Lucky Kitty game (fictitious name) at 11:00 p.m. every Friday night, then the learning machine 360 can over time learn of this trend and of the need for a higher than average positive saturation level (++) for that time because of the high density spatial clustering effect of such large crowds and the concomitant chronological clustering affect due to high play rates of such previously learned about crowds.

Additionally, a chronological clustering conditions detector 350 is provided for detecting when and determining why (likely causes) that tight chronological clustering of jackpot wins occur within given casino areas and/or at given times and/or under other various context attributes (e.g., holidays, convention is in town, graduation parties, certain travel groups filling up the casino hotel, good/bad weather present or expected, etc.). The determinations of the chronological clustering conditions detecting module 350 are fed back to the heuristics learning machine 360 and to the history and trends recording knowledge database 370. Prediction rules formed by the heuristics learning machine 360 are fed forward to the chronological clustering conditions detector 350 for enabling the latter to proactively predict when it needs to increase or decrease the smart-awards fund saturation level (++; via a control 355), when it needs to increase or decrease the duration of the variable smart-awards time window 333 (via control 353) and/or when it needs to increase or decrease the rate at which contributions are made to the smart-awards fund 330 (the a control 340).

The heuristics learning machine 360 may be operatively coupled to numerous inputs for intelligently driving the smart-awards fund contribution and dispersal operations. A first of such inputs is indicated at 361 and provides statistical information about the high-frequency progressive pool for which the respective smart-awards reserves fund 330 is operated. The statistical information may include the average frequency at which the respective progressive jackpot (in funds storage 320) is awarded and the expected statistical variance in the awarding of that jackpot. The statistical information may further include the average size of that progressive jackpot and the expected statistical variance in the jackpot size.

Another input 362 to the heuristics learning machine 360 informs the latter of the number of operating gaming machines that are currently participating in the respective high-frequency progressive pool and the predicted or expected value. These numbers may vary for number of reasons including for example that some machines are in a tilt mode or are not operating for various other reasons and thus had to be taken out of play and/or are expected to soon be taken out of play. Concomitant with providing the number of operating gaming machines (input 362), another input 364 indicates the current rate or aggressiveness of play on each of the machines and/or the predicted rate or aggressiveness of play for each of the machines based on expected or predicted context. Chronological clustering of jackpot hits tends to be a function of both the number of machines being played (or expected to soon be played) and the rate of play at each of those machines (or expected rate in the near future, e.g., in the next half hour) and the number of players. Thus, another interwoven input factor 363 is the current number of players playing on the operative machines (or expected to play in the near future, e.g., in the next quarter or other appropriate fraction of an hour). In some instances a single player may elect to simultaneously play two or more adjacent machines. Another input factor 365 is the current number of both of game wins and jackpot hits and wins and/or the number of each expected in the near future based on historic trends. In a number of different kinds of games, a player is required to win an underlying base game (e.g., attain a low frequency poker hand) before qualifying for a chance at a jackpot. Thus current or soon expected lucky streaks for winning the underlying base game (e.g., poker) can presage current or soon expected lucky streaks at hitting jackpots for a current population of players. Further input factor 366 keeps track of the current degree and/or expected degree of chronological clusterings for the current population of players in winning the underlying base game (e.g., poker) and/or hitting one or more of the jackpots (e.g., mini-jackpot) available with the respective underlying base game. Tight clustering of wins for the base game can presage current or soon expected tight clusterings (e.g., happening within a span of about 10 seconds or less) for hitting one of the jackpots. Further input factor(s) 367 is/are selected to keep track of yet other contextual factors that are discovered by the learning machine 360 to correlate with, or conversely correlate with lack of chronological clustering of jackpot wins such that the learning machine 360 can adjust the rules under which control units 353, 355 and 340 operate so that the smart-awards reserves fund 330 is neither underfunded or overfunded under various environmental contexts and is operated with learned efficiency. Overfunding correlates with too high of a contributions taking rate $R_S$ for feeding the smart-awards reserves fund 330 and thus too low of a rate $R_P$ for feeding and building up the main and/or hidden progressive funds 320. Underfunding correlates with too low of a contributions taking rate $R_S$ for feeding the smart-awards reserves fund 330 such that meter 335 runs into to the negative due to underestimating the amount of smart-awards reserves that will be currently needed to pay off the not-first-in-time winners (runner up winners). In one embodiment, the amount needed in the smart-awards reserves fund 330 is automatically repeatedly computed to be a predetermined multiple (e.g., two times) multiplied by a running average of what is in the main progressive funds 320 over a predetermined averaging window (e.g., last half hour) times the probability that one or more not-first-in-time winners (e.g., 302, 303) will appear in the duration of the variable smart-awards time window 333 within a predetermined next span of time (e.g., within the next quarter of an hour). This formulaic control of the goal amount to be currently held in the smart-awards reserves fund 330 can be supplemented by heuristic rules (e.g., expert rules) developed by the learning machine 360 over time. For example, one such learned rule might say, IF WeatherOutside=Rain THEN Increase Formula Multiple by +1 one time ELSE IF WeatherOutside=JustBecame_Sunny/Warm THEN Decrease Formula Multiple by 10% per hour. Another such learned rule might say, IF Elvis_Impersonators JustArrived THEN Increase duration of the variable smart-awards time window 333 by 2 seconds ELSE IF Elvis_Impersonators have JustLeftBuilding THEN Decrease duration of the variable smart-awards time window 333 by 10% per hour. These are just a few nonlimiting examples.

In one embodiment, there is provided an automated progressive contributions scheduler and progressive optimization balancer. This progressive contributions scheduler and balancer, while not explicitly shown in FIG. 3A is understood in one embodiment to be operatively coupled to the smart-awards reserve fund 330, to the main progressive funds 320 and to the context inputs 361-367 of the learning machine 360 while having been generated by the heuristics development portion of the learning machine 360. The progressive contributions scheduler and balancer can adjust the overall contribution percentage (for the base game and for the smart-awards reserve fund) based on a set of adaptively changing knowledge base rules which can be modified over time and recorded based on AI machine learning in view of changing contexts of the environment. In one embodiment, the initial overall contribution percentage is set (as an example) to 2.75% of placed wagers. In one embodiment, the progressive contributions scheduler operates without any additional features discussed above. In another embodiment, the progressive contributions balancer operates without any additional features discussed above.

A first automated balancer in accordance with the present disclosure includes the following Rule type 1: (Population-based Balancer) {an example algorithm shown in pseudo code form}:

Let P = number of players playing subject game having progressive jackpot;
Let X = Overall Progressive contribution not including remainder wager for the base game
IF P < 20 THEN X = 2.75 ELSE
IF P > 40 THEN X = .40 ELSE
IF P > 20 THEN X = 1.00
<end>

The above automated player number balancer may be generated by an AI machine learning process that learns heuristically that the Overall Progressive contribution (X) is optimally set at 2.75% when the number of players is less than 20 but preferably set to 0.40% when the number of players is greater than 40.

An automated scheduler in accordance with the present disclosure includes the following Rule Type 2: (Day of week Scheduler) {an example algorithm shown in pseudo code form}:

Let D=Day of the week
Let X=Overall Progressive contribution not including remainder wager for the base game
IF D=Tuesday THEN X=2.75 ELSE
IF D=Friday THEN X=2.50 ELSE . . . .

The above Day of week scheduler may be generated by an AI machine learning process that learns heuristically that the Overall Progressive contribution (X) is optimally set at 2.75% on Tuesdays. But because larger crowds show up at the casino on Fridays, X is preferably reduced to 2.50 on Fridays.

An automated combination scheduler and main fund seeder in accordance with the present disclosure includes the following Rule Type 3: (Context-aware Scheduler+Seeder) {an example algorithm shown in pseudo code form}:

Let H=Hours Idle with no player engaged with game
Let R1=First predetermined Rate over time
Let S=Smart-awards Reserve pool contribution
Let PR=Progressive pool fund
IF H=0.50 THEN contribute (re-distribute) from S to PR at R1 rate over time, ELSE . . . .

The idea of the above automated combination scheduler and seeder example is to smartly detect that the amount held in the smart-awards reserve fund is being wasted if there are no players (as one nonlimiting example) in the game for at least a predetermined idle time. It starts shifting the funds held in the smart-awards reserve fund to the main progressive pool fund so that the posted progressive jackpot pool amount climbs even though there are no players currently contributing to the jackpot. Hopefully this idle-time incrementing of the displayed jackpot amount will attract players to the game and then based on the number of players who join in and/or the day of week, a different context-aware algorithm takes over once the game is no longer considered idle. It is to be understood that although the above example activates the incremental funds shift from the smart-awards reserve fund to the main progressive pool fund when the population P of players contributing to the progressive jackpot pool is zero for more than a predetermined idle time (e.g., H=0.50 hour), it is within the contemplation of the disclosure to automatically activate the incremental funds shift from the smart-awards reserve fund to the main progressive pool fund when, for a heuristically determined time duration (corresponding to idle time), the population P of players contributing to the progressive jackpot pool is less than a heuristically determined number greater than zero but less than what the history and trends database 370 predicts for the extant context (361-367) and thus the likelihood of second winner hits (e.g., 302, 303) is substantially smaller than that pro-actively anticipated for the current funding of the smart-awards reserve fund 330 such that the excess in the smart-awards reserve fund 330 can be incrementally shifted over time from the smart-awards reserve fund to the main progressive pool fund. While an unexpectedly low (or zero) current player population is one example of a reason for shifting funds in view of a disparity between predicted context and actual context, other contextual factors can trigger the shift as well, for example if current player activity is less than what was predicted (e.g., for what should be a hopping Friday night but is not). More generally therefore, the heuristics developed by the automated learning machine can include an automated triggering of shifting (e.g., an over-time incremental shifting) of funds from the smart-awards fund to the progressive jackpot pool when a detected current context of the gaming machines indicates a lower than predicted likelihood of not-first-in-time players respectively hitting the jackpot pool within the predetermined smart-awards time window such that the amount currently in the smart-awards reserve fund 330 is deemed excessive. In addition to triggering the shifting, other compensating measures can be simultaneously or afterwards undertaken such as reducing the contributions rate $R_S$ for the smart-awards fund and/or reducing the positive saturation level (++) and/or reducing the length of the variable smart-awards time window 333.

In one embodiment, chronological clustering of hits on a given progressive jackpot pool is determined in terms of relative degree. The degree can indicate how varied/deviated from normal (e.g., average taken over a substantially longer time window) is the current average delay between consecutive hits ($Avg(t_{h(i+1)}-t_{hi})$). For example, in one embodiment:

$$\text{Degree of deviance} = \frac{(Avg(t_{h(i+1)} - t_{hi}))_{Window\_small}}{(Avg(t_{h(i+1)} - t_{hi}))_{Window\_big}}$$

where Window_big is a larger rolling window for averaging and can be for example on the order of 15 minutes, 30 minutes, an hour or the like while Window_small is a substantially smaller rolling window for averaging and can be for example on the order of 5 minutes, 1 minute, 30 seconds or the like. Degree of chronological clustering of players or gaming machines currently participating in the given jackpot can be similarly computed as average number of players/machines taken over a smaller rolling window versus average number taken over a substantially larger rolling window. Degree of spatial clustering of players or gaming machines currently participating in the given jackpot or of nearby bystanders can be similarly computed as average density per unit of floor space taken over a smaller rolling window versus average density per unit of floor space taken over a substantially larger rolling window.

Aside from developing heuristic rules (e.g., expert rules) based on experience, the automated learning machine 360 may also instruct the History and Trends Determining database 370 to begin keeping track of certain contextual factors and their trend statistics and/or to stop keeping track of certain other contextual factors and their trend statistics. This may occur as the learning machine 360 develops a better understanding of which contextual factors better correlate with a specific game, its high frequency jackpot hits and predicting how much should be optimally fed as over time contributions into the respective smart-awards reserves fund 330 (or returned to the main fund), how fast and how wide or narrow the smart-awards time window 333 should be kept as opposed to other contextual factors which do not correlate at all or correlate less strongly. By searching for the contextual factors that have the stronger correlations and by eliminating the contextual factors that have no or weaker correlations, the learning machine 360 automatically reduces the strain that the smart-awards mechanism 300 places on the data processing resources of the casino and thus improves the efficiency and speed of those data processing resources while reducing operating costs.

Figure 4:
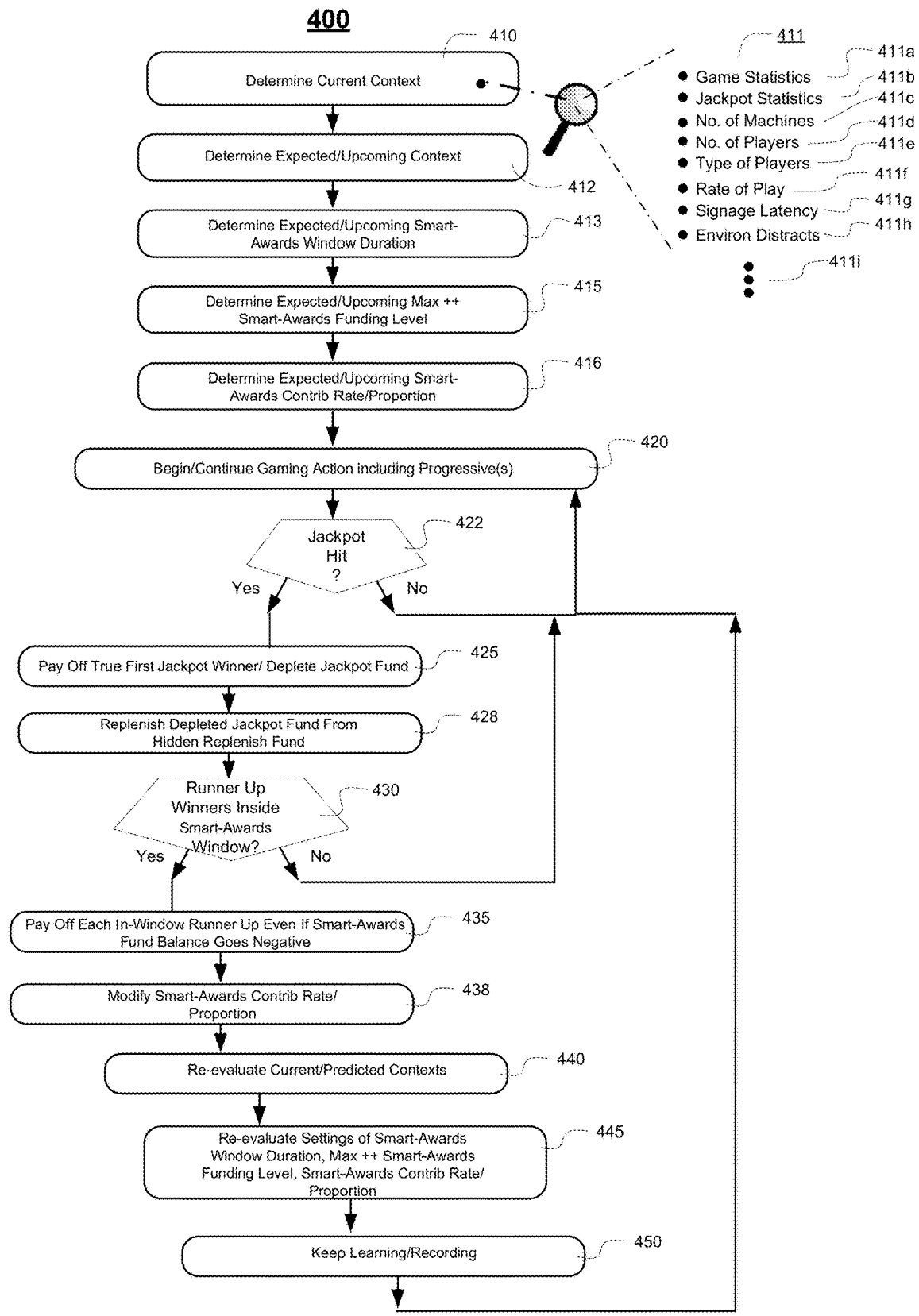
FIG. 4 illustrates a machine-implemented method in accordance with the present disclosure of reducing risk that one or more of plural players who hit respective wins for a same progressive jackpot pool within short time of one another will not feel cheated by being awarded a lesser prize.

FIG. 4 is a flow chart of a smart-awards providing process 400 in accordance with the present disclosure. Entry may be made at step 410 in which the current context of a jackpot providing game is automatically determined by use of appropriate sensors, database records and the like. More specifically, as indicated in magnification 411, the current context determination for a respective jackpot providing game (e.g., slot machine poker with jackpot opportunities granted for predetermined hands) may include a first determination 411a of the probability that a chance at the jackpot will be granted (e.g., probability of first hitting two Kings or better). The current context determination may alternatively or additionally include a second determination 411b of the probability that the subject jackpot (e.g., a high frequency jackpot such as a mini-jackpot) will be hit once the chance for spinning, scratching, etc. for it is granted. The current context determination may alternatively or additionally include a third determination 411c of the number of gaming machines (and/or banks of such machines) that are currently operatively participating in and/or able to participate in the respective progressive jackpot pool (e.g., mini-jackpot). It may alternatively or additionally include a fourth determination 411d of the number of players that are currently actively participating in the jackpot providing game and/or the number of nearby bystanders who can very quickly (e.g., within seconds, minutes) begin to actively participate in the gaming actions. It may alternatively or additionally include a fifth determination 411e of the kind of players (their nature, disposition and/or demographics) who are currently actively participating in the jackpot providing game and/or the kind of nearby bystanders (their nature, etc.) who can very quickly begin to actively participate in the gaming actions. (The determined natures, dispositions and/or demographics should preferably include those that strongly correlate to whether those players will feel cheated or not for different settings of the variable smart-awards time window 333; for example, age, socioeconomic class and temperament.) It may alternatively or additionally include a sixth determination 411f of the current rate and/or recent average rate of play on the respective machines. It may alternatively or additionally include a seventh determination 411g of the current and/or recent average (e.g., within the last few minutes) signage update latency on the local signage devices that advertise the current jackpot amount. It may alternatively or additionally include a eighth determination 411h of the level of local distractions (e.g., noises, side shows, commotions) that the current players are exposed to. Distractions may lead to players looking away from the local signage devices that advertise the current jackpot amount and thus not realizing that the last seen high jackpot amount has been won just a few seconds ago by someone else. Sensors for detecting distractions may include various sound and light detectors as well as vibration detectors, heat detectors (e.g., IR based), moisture detectors (e.g., spilt drinks), etc.). The given examples are to be understood as not limiting. Ellipses 411i represent yet other contextual factors that may be useful for determining for example, what duration to set the variable smart-awards time window 333 at.

After current context is determined at step 410, a further determination is preferably made at step 412, based on the predetermined current context and based on historical/trend data stored in database 370 and on prediction rules learned/developed by the heuristics learning machine 360, what context should be expected in the near future (e.g., within the next 5, 10 minutes) for the subject, jackpot providing game.

In step 413, the contextual information developed in steps 410 and 412 are fed to the heuristics learning machine 360 for receiving a corresponding fixed number or rule-driven formulation for what to set the duration of the smart-awards time window 333 to for operations expected to be occurring within the near future (e.g., within the next 5, 10 minutes or beyond).

In step 415, the contextual information developed in steps 410 and 412 are fed to the heuristics learning machine 360 for receiving a corresponding fixed number or rule-driven formulation for what to set the smart-awards fund saturation level (++; via a control 355) to for operations expected to be occurring within the near future (e.g., within the next 5, 10 minutes or beyond).

In step 416, the contextual information developed in steps 410 and 412 are fed to the heuristics learning machine 360 for receiving a corresponding fixed number or rule-driven formulation for what to set the contributions feed rate $R_S$ for feeding the smart-awards reserves fund 330 such that meter 335 will not run into to the negative for operations expected to be occurring within the near future (e.g., within the next 5, 10 minutes or beyond).

With the smart-awards funding parameters established in above steps 410-416, gaming action may begin and/or continue in step 420 while the smart-awards reserves fund 330 is automatically funded in the background according to those parameters.

Test 422 determines whether the subject progressive jackpot (e.g., mini-jackpot) has been hit after the automatic funding of the smart-awards reserves fund 330 has begun at step 420. Although not shown, it is to be understood that any number of gaming actions may have taken place between steps 420 and 422 without any of the participating players having been offered the chance to spin for or otherwise attempt to hit the jackpot. If the answer to test 422 is no, meaning no one has hit the jackpot yet, control is returned to step 420.

On the other hand, if the answer to test 422 is yes, meaning a specific player (e.g., 301) was the first-in-time winner of the jackpot, control advances to step 425. That first-in-time true winner of the jackpot is paid off in step 425, thus depleting the main progressive jackpot fund 320 per the rules of the game.

In subsequent step 428, the depleted main progressive jackpot fund 320 is replenished out of one of the hidden replenishment funds. The replenishment amount becomes the new publically advertised jackpot amount as displayed on the public signage devices (which may be subject to a current signage update latency). In one variation, part of the hidden replenishment funds is used to replenish the main progressive jackpot fund 320 while a heuristically determined remainder is used to jump start the replenishing of the smart-awards reserve fund 330.

Test 430 determines whether there were any not-first-in-time runner up winners who hit inside the current smart-awards time window 333 and if so, who they are (and/or what machines they hit the jackpot on). If the answer to test 430 is no, meaning there are no not-first-in-time winners for the just hit jackpot, control is returned to step 420.

On the other hand, if the answer to test 430 is yes, meaning there is one or more runner up winners (e.g., 302, 303 or runner up machines) that have hit the jackpot (or have otherwise claimed a win e.g., in a bingo type game) within the current duration of the smart-awards time window 333, control advances to step 435. In accordance with one embodiment, each of the runner up winners in the smart-awards time window 333 is paid the same amount as was paid to the first-in-time winner (e.g., 301) irrespective of their position within window 333 and irrespective of the extent to which such paying off of all the runner up winners depletes the smart-awards reserves fund 330 and/or drives it into the red (negative). In accordance with an alternate embodiment, the runner up winners are paid out of the smart-awards reserves fund 330 in the order in which they appear in the window 333 and the sequential rewarding of these not-first-in-time winners out of the smart-awards reserves fund 330 stops when the next of the sequential pay offs drives the fund further into the red than a predetermined negative balance (e.g., a predetermined—saturation level). Remaining runner up winners are switched to getting paid off from the replenished main progressive jackpot fund 320.

In subsequent step 438, if withdrawals were made out of the smart-awards reserves fund 330 in step 435, the current balance of the smart-awards reserves fund (which could be negative) is evaluated and heuristically-driven determination is made as to whether and to what extent the over-time contributions feed rate $R_S$ for replenishing the smart-awards reserves fund 330 should be modified in view of any changed contextual factors (e.g., that the high frequency jackpot paid off multiple players and now bystanders are rushing in to participate in the gaming actions of the apparently lucky machines). In step 440, yet further changes to the current and/or expected contexts of the jackpot providing gaming machines associated with corresponding smart-awards reserves fund 330 are re-evaluated. In step 445, the respective settings of the smart-awards time window 333, of the smart-awards fund positive saturation level (++) (and optionally of a smart-awards fund negative saturation level (−−)) and of the smart-awards contribution rate $R_S$ are re-evaluated in view of the re-evaluated contexts of step 440 and appropriate modifications are made accordingly. Step 450 represents the automatically repeated learning and recording activities respectively of the heuristics learning machine 360 and the recording of historical and trends data into database 370. Control then returns to step 420 to await the next high frequency jackpot hit while repeating the No loop of step 422.

Figure 6:
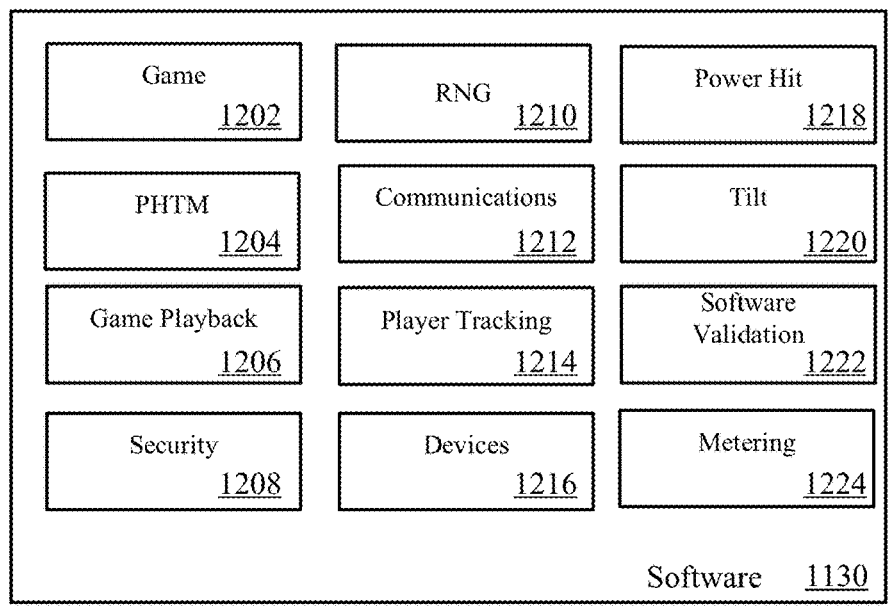
FIG. 6 illustrates a block diagram of gaming software in accordance with the present disclosure.

Referring to FIG. 5, details of a gaming machine controller that may be used to control the play of wager-based games including generating the game presentations and controlling the various gaming devices is described. FIG. 6 illustrates a block diagram of gaming machine components including a securely housed gaming machine controller (GMC) 1160. The GMC 1160 can be coupled to an external power supply 1146, displays such as 1018' 1012; etc., I/O devices 1134, external non-transient memories, such as a disk drive 1136, a power-off security device 1138, security sensors 1140, communication interfaces 1142 and meters 1144.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth™ Wi-Fi, and NFC. A schematic indication of such a wireless communication interface 1046 is shown in FIG. 1. The remote servers (e.g., each server including one or more data processing units such as CPUs and appropriate memory such as SRAM, DRAM, Flash etc.) can form and provide the network services of block 1004 as described above with respect to FIGS. 1A and 2. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIGS. 1A and 2). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, hash matching techniques.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1A. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the pay table, assets, and player files. The resulting information can be compared against the decrypted results from the manifest file and/or from a secure encrypted database server (not shown). If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in a secure encrypted database server (not shown).

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 10.

Various embodiments in accordance with the disclosure can include one or more of the following as components thereof: as a CPU (e.g., 1102) or other processor: an Intel LGA1150™ Socket set (H3 socket) populated by a Haswell G3420™ dual core; for the Northbridge hub (e.g., 1106): an Intel Q87 Platform Controller Hub (PCH)™ chip set; for the Southbridge hub (e.g., 1108): this part is integrated within Q87 PCH™ chip set; for the system memory Bus (e.g., 1112): a PCI Express ×16 Bus; for system Memory Slots (e.g., 1115): Dual 200 pin SODIMM, Non-ECC DDR3, providing e.g., 8 GB total; for NV RAM (e.g., 1122): a PCIe ×1 Interface, e.g., providing 8 MB Battery Backed SRAM; for a backup Battery (e.g., 1124): a CR2032; for FLASH ROM(BIOS) (e.g., 1126): the SPI FLASH, W25Q128™ using a LOTES ACA-SPI-004-K01 Socket™; for Super I/O interface (e.g., 1128): a Realtek F81866AD-I™; for Gaming Software (e.g., 1130 Software): corresponding Game Software stored on 32 GB 2.5" SSD; for Software Verification (e.g., 1132): OS Software stored on a 4 GB CF Card; for a Power Supply (e.g., 1146): the N2 Power XL375-12™ controller; for a UPS (e.g., 1148): the CyberPower CP1350™ controller.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

A gaming machine controller configured to generate a wager-based game in accordance with player selected volatility parameters is described with respect to FIG. 5. Gaming software used to generate the wager-based game is discussed with respect to FIG. 6. With respect to FIG. 6, a power hit tolerant memory (PHTM) configured to store crucial data generated from playing the wager-based game is discussed. The crucial data can include information associated with selected volatility parameters and wager-based games generated using the selected volatility parameters.

Figure 8:
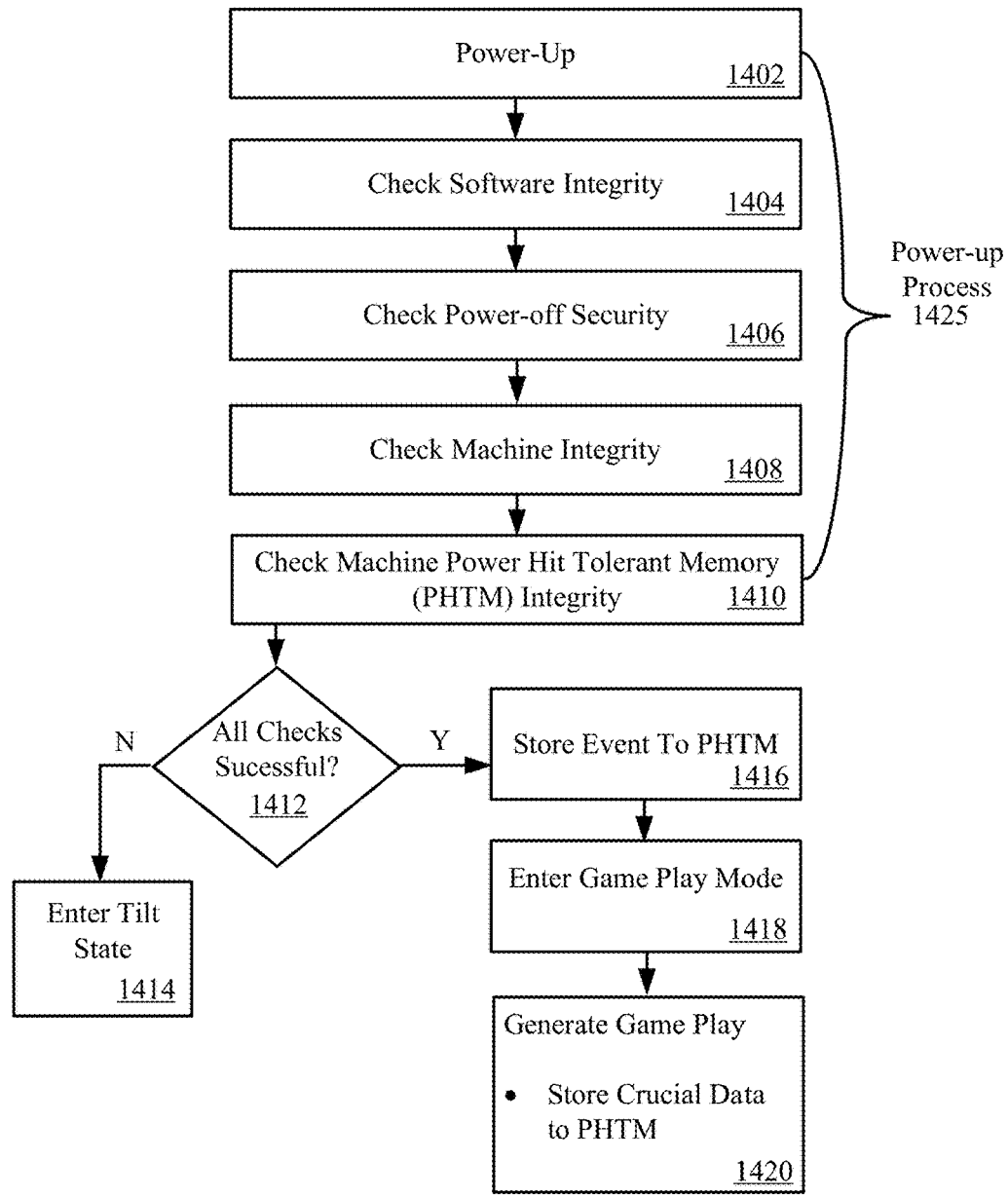
FIG. 8 illustrates a method powering up a gaming machine in accordance with the present disclosure.
Figure 9:
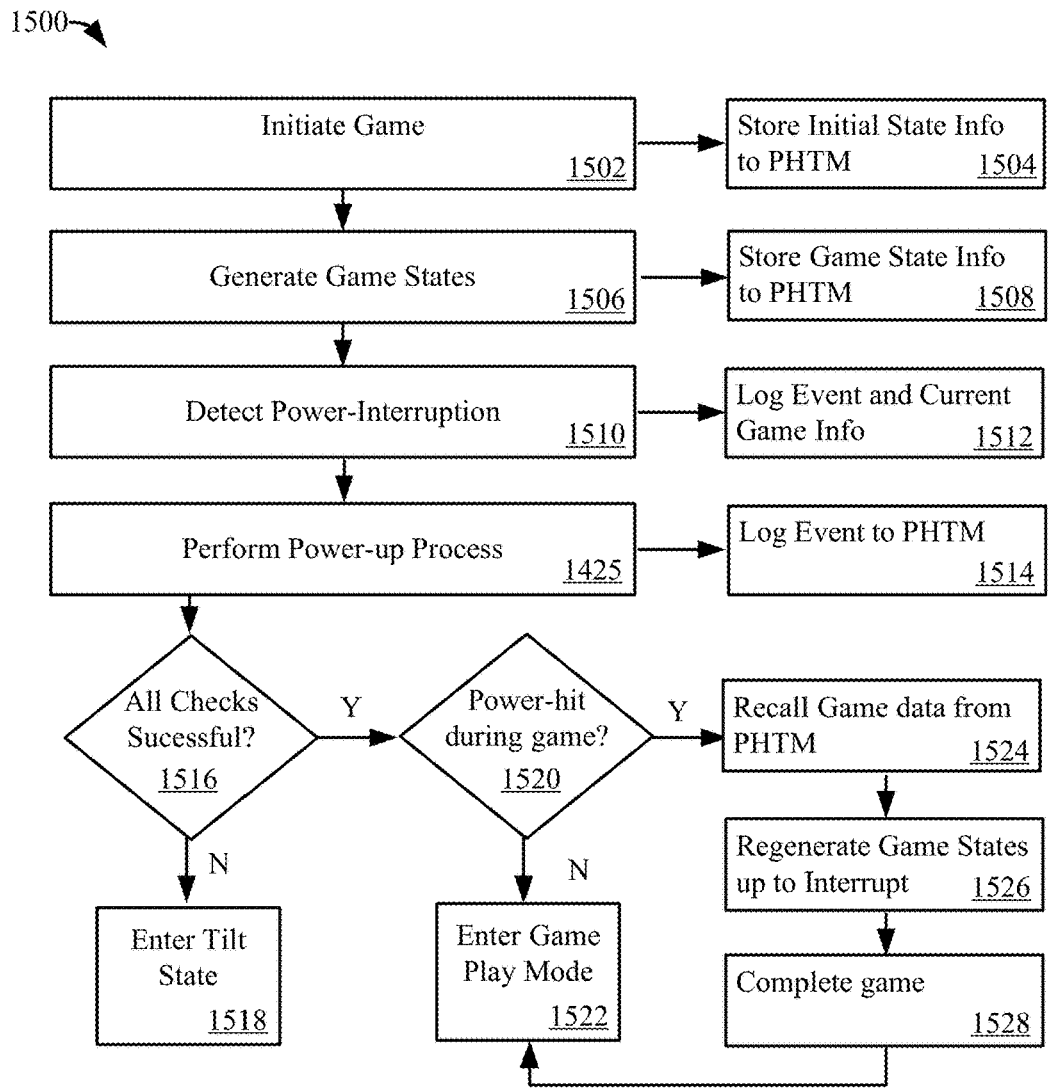
FIG. 9 illustrates a method for responding to a power interruption on a gaming machine in accordance with the present disclosure.

With respect to FIG. 9, a method for responding to a power interruption on a gaming machine, which utilizes the power hit tolerant memory, is discussed. With respect to FIG. 8, a method of powering up a gaming machine is described. Finally, with respect to FIG. 10, a method playing back a game, such as a wager-based game including a first primary game and a second primary game, previously played on a gaming machine is discussed.

FIG. 6 illustrates a block diagram of examples of gaming software 1130 that can be executed by a Gaming Machine Controller (GMC) 1160 in FIG. 5. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 1208 can be configured to respond to information received from various security sensors disposed on the gaming machine and from the power-off security device (e.g., see 1138 in FIG. 5). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 5) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range $[0, 2^k-1]$ for k-bit word length with a period of $(2^19937)-1$ can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1A) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1A) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 5 or 1204 in FIG. 6) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1A). This tilt can be cleared by clearing the jam and reinserting the paper into the printer.

A "PAPER OUT" tilt can occur when the printer runs out of tickets (e.g., see printer 1022 in FIG. 1A). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 5), the memory storing the BIOS (e.g., see BIOS 1126 in FIG. 4) or the PHTM storing crucial data (e.g., see NVRAM 1122 in FIG. 5). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 5) and the GMC (e.g., see GMC 1160 in FIG. 5) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1A). The tilt condition can be displayed on the display, such as main display 1018 in FIG. 1A. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1A). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in a secure encrypted database server). This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 5). Examples of the meters which can be maintained are described above with respect to meters 1144 in FIG. 5.

FIG. 6 illustrates a block diagram of one embodiment of a power hit tolerant memory (PHTM) (Additional details of PHTMs are described with respect to NVRAM 1122 in FIG. 6 and PHTM 1204 in FIG. 6). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

Figure 7:
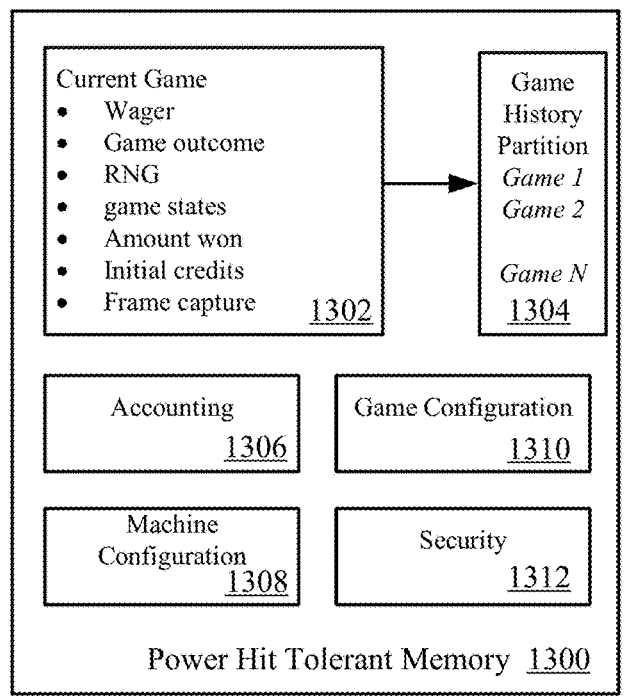
FIG. 7 illustrates a block diagram of power hit tolerant memory in accordance with the present disclosure.

FIG. 7 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 5), which may be a conventional ROM device. This conventional ROM device can load and can verify the initial code which continues the "verify then load" ladder of trust until the entire operating system and the game is loaded. This process was described above in detail with respect to FIG. 5.

In 1406, the power-off security device (see 1138 in FIG. 5) can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1A).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine.

After credits are deposited, the gaming machine can be used to make wagers on the game(s) available for play on the gaming machine. In 1420, the GMC can generate wager-based game play on the gaming machine and store crucial game play data to the PHTM.

FIG. 9 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 8 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 10:
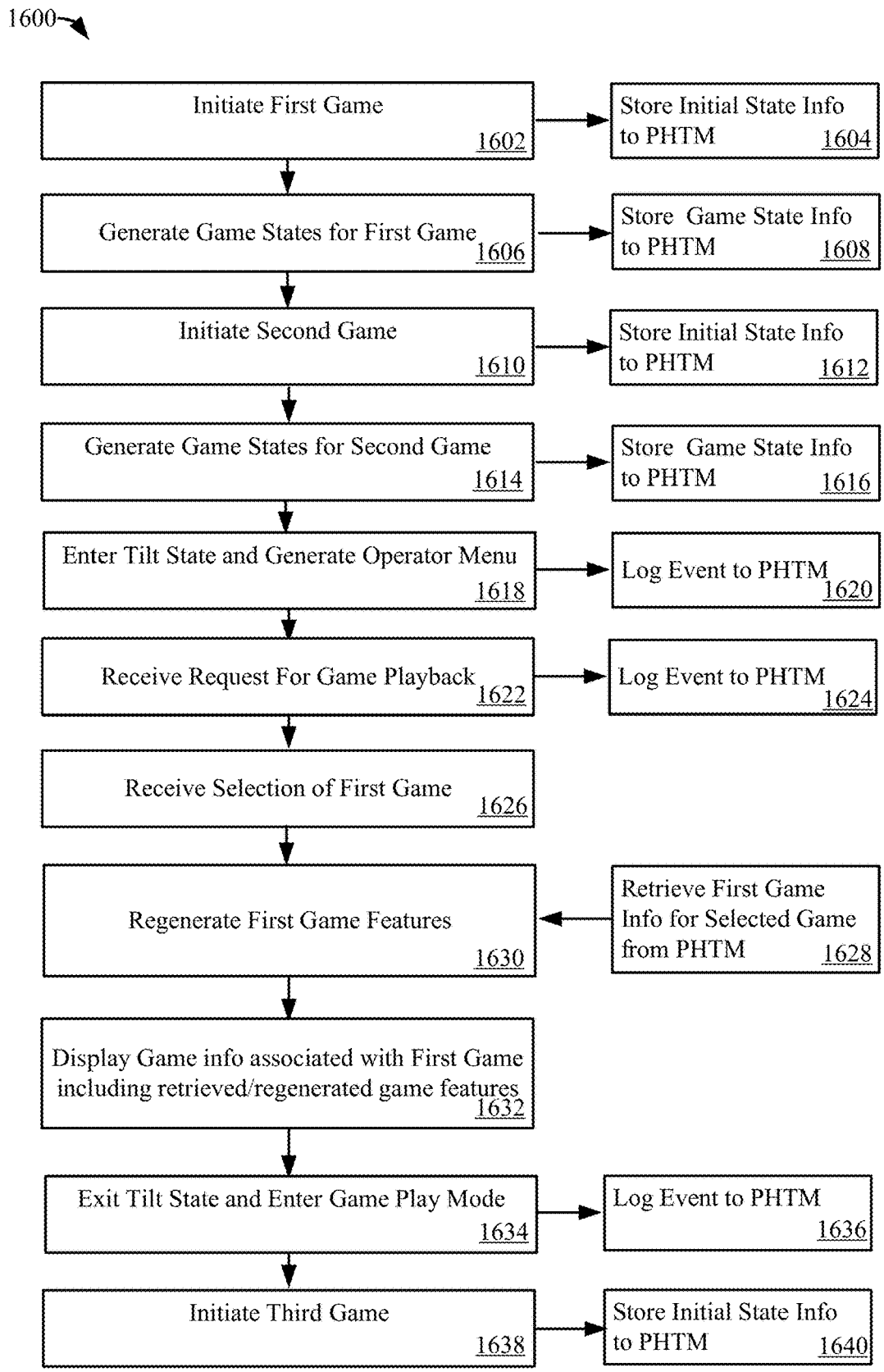
FIG. 10 illustrates a method playing back a game previously played on a gaming machine in accordance with the present disclosure.

FIG. 10 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 5) can be configured to restore the game and the gaming machine to a game state just prior to the power hit using information retrieved from the PHTM (e.g., see NVRAM 1122 in FIG. 5).

After the completion of the first game, in 1610, a second game can be initiated. The initial state information for the second game can be stored to the PHTM (e.g., see NVRAM 1122 in FIG. 5). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1A). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. A machine system comprising:
a first plurality of gaming machines respectively hosting respective wager-based games, where the hosted wager-based games collectively participate in a first progressive jackpot pool that can be won by chance through playing of the respective wager-based games of the first plurality of gaming machines and where occurrence of a first-in-time jackpot winning hit in one of the first plurality of gaming machines depletes the first progressive jackpot pool; and
a controller operatively coupled to the first plurality of gaming machines and including a processor and a memory, the controller automatically determining if a first-in-time jackpot winning hit for the participated-in first progressive jackpot pool occurred on one of the first plurality of gaming machines, the controller also automatically determining, responsive to determining that the first-in-time jackpot winning hit occurred, if within a predetermined smart-awards time window but after the first-in-time jackpot winning hit, a follow-on jackpot winning hit occurred on another of the first plurality of gaming machines, the controller responsively awarding to the other gaming machine among the first plurality, a smart-awards award from a background-funded first smart-awards reserve fund, the smart-awards award matching the amount depleted from the first progressive jackpot pool for the determined first-in-time jackpot winning hit occurring among the first plurality of gaming machines.

2. The machine system of claim 1 wherein:
the respective wager-based games of the first plurality of gaming machines are the same and chance of winning through playing of the respective wager-based games is relatively high such that on average a jackpot winning hit occurs among the participating first plurality of gaming machines on the order of every few minutes or less rather than at a slower rate of about one hit per hour or longer.

3. The machine system of claim 2 wherein:
the chance of winning through playing of the respective wager-based games is such that on average a jackpot winning hit occurs among the participating first plurality of gaming machines every 20 seconds or less.

4. The machine system of claim 2 wherein:
the respective wager-based games are a same slot machine game.

5. The machine system of claim 1 wherein:
two or more of the first plurality of gaming machines are adjacent one to the next.

6. The machine system of claim 1 wherein:
the first plurality of gaming machines are disposed within a same casino.

7. The machine system of claim 1 wherein:
the first plurality of gaming machines additionally participate in a second progressive jackpot pool that can be won by chance through playing of the respective wager-based games, where chance of winning the second progressive jackpot pool is less than chance of winning the first progressive jackpot pool.

8. The machine system of claim 6 wherein:
the first plurality of gaming machines additionally participate in a third progressive jackpot pool that can be won by chance through playing of the respective wager-based games, where chance of winning the third progressive jackpot pool is less than chance of winning the second progressive jackpot pool.

9. The machine system of claim 1 wherein:
the controller causes the smart-awards time window to vary as a function of a current number of gaming machines participating in the first jackpot pool.

10. The machine system of claim 1 wherein:
the controller causes the smart-awards time window to vary as a function of a current number of players participating in the first jackpot pool.

11. The machine system of claim 1 wherein:
the controller causes the smart-awards time window to vary as a function of a currently sensed level of distractions that players participating in the first jackpot pool are subject to.

12. The machine system of claim 1 wherein:
the controller causes the smart-awards time window to vary as a function of a currently sensed level of spatial clustering of players participating in the first jackpot pool.

13. The machine system of claim 1 wherein:
the controller causes the smart-awards time window to vary as a function of time of day and day of week.

14. The machine system of claim 1 wherein:
the controller controls a rate of funding of the background-funded first smart-awards reserve fund as a function of current number of gaming machines participating in the first jackpot pool.

15. The machine system of claim 1 wherein:
the controller controls a rate of funding of the background-funded first smart-awards reserve fund as a function of rate of play by players of the first plurality of gaming machines.

16. The machine system of claim 1 and further comprising:
a second plurality of gaming machines respectively hosting respective second wager-based games, where the hosted second wager-based game collectively participate in a second progressive jackpot pool that can be won by chance through playing of the respective second wager-based games of the second plurality of gaming machines and where occurrence of a first-in-time jackpot winning hit in one of the second plurality of gaming machines depletes the second progressive jackpot pool; and
wherein the controller is operatively coupled to the second plurality of gaming machines and the controller automatically determines if a first-in-time jackpot winning hit for the participated-in second progressive jackpot pool occurred on one of the second plurality of gaming machines, the controller also automatically determining, responsive to determining that the first-in-time jackpot winning hit occurred on one of the second plurality of gaming machines, if within a second predetermined smart-awards time window but after the first-in-time jackpot winning hit on one of the second plurality of gaming machines, a follow-on jackpot winning hit occurred on another of the second plurality of gaming machines, the controller responsively awarding to the other gaming machine among the second plurality, a second smart-awards award from a background-funded second smart-awards reserve fund, the second smart-awards award matching the amount depleted from the second progressive jackpot pool for the determined first-in-time jackpot winning hit occurring among the second plurality of gaming machines.

17. The machine system of claim 16 wherein:
the respective first and second pluralities of gaming machines are spatially disposed in nearby respective sections of a gaming area; and
the controller causes the first and second smart-awards time windows to vary as a function of respective first and second current number of players participating in the first and second jackpot pools so as to thereby manage spatial clustering of players in the respective sections of the gaming area.

18. A machine-implemented method carried out for a first plurality of gaming machines respectively hosting respective wager-based games, where the hosted wager-based game collectively participate in a first progressive jackpot pool that can be won by chance through playing of the respective wager-based games of the first plurality of gaming machines and where occurrence of a first-in-time jackpot winning hit in one of the first plurality of gaming machines depletes the first progressive jackpot pool, the method comprising:
automatically determining if a first-in-time jackpot winning hit for the participated-in first progressive jackpot pool occurred on one of the first plurality of gaming machines;
automatically determining, responsive to determining that the first-in-time jackpot winning hit occurred, if within a predetermined smart-awards time window but after the first-in-time jackpot winning hit, a follow-on jackpot winning hit occurred on another of the first plurality of gaming machines; and
responsive to determining that the follow-on jackpot winning hit occurred, awarding to the other gaming machine among the first plurality, a smart-awards award from a background-funded first smart-awards reserve fund, the smart-awards award matching the amount depleted from the first progressive jackpot pool for the determined first-in-time jackpot winning hit occurring among the first plurality of gaming machines.

19. In a machine-assisted bingo style wagering game having a predetermined first time window within which players are to proclaim their corresponding winning symbols combination after a winning combination-completing symbol is selected by chance, a method of awarding additional players who proclaim shortly after the predetermined first time window closes, the method comprising:
automatically determining if the additional players were subject to one or more contextual factors that could have delayed their proclamations of having a corresponding winning symbols combination until after the predetermined first time window closed; and
adding a second time window to proclaim for the additional players so that they thereby participate in an award awarded for timely proclaimed completion of a corresponding winning symbols combination, the added second time window being a variable smart awards window immediately following the first time window, the smart awards window having a duration that is a function of one or more of the contextual factors that the additional players were subject to.

20. The method of claim 19 wherein:
the one or more of the contextual factors include a degree of distractions that the additional players were subject to.

21. The method of claim 20 wherein:
the degree of distractions includes a level of noise that the additional players were subject to.

22. The method of claim 20 wherein:
the degree of distractions includes a complexity of a side activity that the additional players were participating in.

23. The method of claim 19 wherein:
the one or more of the contextual factors include demographics of the additional players.

24. A system comprising:
a plurality of player usable means for enabling respective players to participate in respective wager-based games, where the wager-based games entitle one or more of the players to by chance win a pool-based award if a corresponding winning hit is achieved by the one or more players within a first time window; and
controller means operatively coupled to the plurality of player usable means, the controller means being for determining if there are additional players who could have been entitled to the pool-based award but for having missed termination of the first time window by a variable follow-on duration constituting a second time window immediately following the first time window; the controller means being for determining the variable duration of the second time window based on contextual factors that the additional players were subjected to, and the controller means being further for determining an award amount to be given to the additional players who missed the first time window and instead achieved a corresponding winning hit within the second time window.

* * * * *